(12) United States Patent
Abràmoff et al.

(10) Patent No.: US 7,474,775 B2
(45) Date of Patent: Jan. 6, 2009

(54) AUTOMATIC DETECTION OF RED LESIONS IN DIGITAL COLOR FUNDUS PHOTOGRAPHS

(75) Inventors: Michael D. Abràmoff, University Heights, IA (US); Bram van Ginneken, Utrecht (NL); Meindert Niemeijer, Utrecht (NL)

(73) Assignee: University of Iowa Research Foundation, Iowa City, IA (US)

( * ) Notice: Subject to any disclaimer, the term of this patent is extended or adjusted under 35 U.S.C. 154(b) by 190 days.

(21) Appl. No.: 11/392,268

(22) Filed: Mar. 29, 2006

(65) Prior Publication Data

US 2006/0257031 A1   Nov. 16, 2006

Related U.S. Application Data

(60) Provisional application No. 60/666,868, filed on Mar. 31, 2005.

(51) Int. Cl.
*G06K 9/00* (2006.01)
*G06K 9/34* (2006.01)
*A61B 5/00* (2006.01)
*A61B 13/00* (2006.01)
*A61B 3/14* (2006.01)

(52) U.S. Cl. .................. 382/128; 382/117; 382/173; 382/190; 382/224; 600/318; 600/558; 351/206

(58) Field of Classification Search .............. 382/100, 382/115, 117, 128, 173–180, 190–195, 224–227; 600/300, 318, 356, 357, 400, 558, 162, 236; 351/200, 206, 211
See application file for complete search history.

(56) References Cited

U.S. PATENT DOCUMENTS

| | | | | |
|---|---|---|---|---|
| 4,883,061 A | * | 11/1989 | Zeimer | 600/477 |
| 4,998,533 A | * | 3/1991 | Winkelman | 600/368 |
| 5,233,517 A | * | 8/1993 | Jindra | 600/558 |
| 5,270,924 A | | 12/1993 | Hideshima | |
| 5,303,709 A | * | 4/1994 | Dreher et al. | 600/476 |
| 5,857,030 A | | 1/1999 | Gaborski et al. | |
| 5,868,134 A | | 2/1999 | Sugiyama et al. | |
| 6,053,865 A | * | 4/2000 | Sugiyama et al. | 600/300 |
| 6,104,828 A | | 8/2000 | Shioiri | |
| 6,453,057 B1 | * | 9/2002 | Marshall et al. | 382/117 |
| 6,556,853 B1 | * | 4/2003 | Cabib et al. | 600/407 |
| 6,567,682 B1 | | 5/2003 | Osterweil et al. | |
| 6,714,672 B1 | | 3/2004 | Berestov et al. | |

(Continued)

OTHER PUBLICATIONS

"Segmentation"; Image Processing Fundamentals—Segmentation; Website: www.ph.tn.tudelft.nl/Courses/FIP/frames/fip-Segmenta. html; pp. 1-9.

(Continued)

*Primary Examiner*—Bhavesh M Mehta
*Assistant Examiner*—Manav Seth
(74) *Attorney, Agent, or Firm*—Ballard Spahr Andrews & Ingersoll, LLP

(57) ABSTRACT

Disclosed is an automated method which can detect images containing red lesions. First, each image is preprocessed; next, candidate objects that may represent red-lesions are extracted; and in the final stage the probability for each candidate to represent a red-lesion is estimated using a classifier and a large set of specifically designed features.

30 Claims, 12 Drawing Sheets

U.S. PATENT DOCUMENTS

| | | | |
|---|---|---|---|
| 6,728,561 | B2 | 4/2004 | Smith et al. |
| 6,731,782 | B2 | 5/2004 | Ashton |
| 6,757,409 | B2 * | 6/2004 | Marshall et al. ............ 382/117 |
| 6,830,336 | B2 | 12/2004 | Fransen |
| 6,996,260 | B1 * | 2/2006 | Skands et al. ............... 382/128 |
| 2003/0071970 | A1 | 4/2003 | Donnerhacke et al. |
| 2004/0037453 | A1 * | 2/2004 | Marshall et al. ............ 382/117 |
| 2004/0085542 | A1 | 5/2004 | Soliz et al. |
| 2004/0105074 | A1 | 6/2004 | Soliz et al. |
| 2007/0002275 | A1 * | 1/2007 | Yan et al. .................... 351/200 |

OTHER PUBLICATIONS

Eye Conditions Encyclopedia; "Optic Nerve Imaging"; EyeMDLink.com; Dec. 3, 2005; pp. 1-2.

Swindale, et al.; "Automated Analysis of Normal and Glaucomatous Optic Nerve Head Topography Images"; Investigate Ophthalmology & Visual Science; vol. 41; No. 7; Jun. 2000; pp. 1730-1742.

Keith Goatman; "Automated Detection of Microaneurysms"; Website: www.biomed.abdn.ac.uk/Abstracts/A07890/; Abstracts Reports; Bio-Medical Physics & Bio-Engineering, University of Aberdeen; 2002; pp. 1-6.

Ginneken, et al.; "IOP Image Processing Project Proposal: Computer-aided Diagnosis for Diabetic Retinopathy Detection in Fundus Images"; Apr. 5, 2002; pp. 1-23.

Chrástek, et al.; "Automated Segmentation of the Optic Nerve Head for Diagnosis of Glaucoma"; Medical Image Analysis 9; 2005; pp. 297-314.

Yale Medicine Winter/Spring 1998; "Imaging the Eye"; Medicine's New Eyes; pp. 1-3.

Huang, et al.; "Development and Comparison of Automated Classifiers for Glaucoma Diagnosis Using Stratus Optical Coherence Tomography"; Investigative Ophthalmology & Visual Science; vol. 46; No. 11; Nov. 2005; pp. 4121-4129.

Lliev, et al.; "Morphometric Assessment of Normal, Suspect and Glaucomatous Optic Discs with Stratus OCT and HRT II"; Eye 2005; pp. 1-12.

Martus, et al.; "Multivariate Approach for Quantification of Morphologic and Functional Damage in Glaucoma"; Investigative Ophthalmology & Visual Science; vol. 41, No. 5; Apr. 2000; pp. 1099-1110.

Johnson, et al.; "Structure and Function Evaluation (SAFE): II. Comparison of Optic Disk and Visual Field Characteristics"; American Journal of Ophthalmology; vol. 135; No. 2; 2003; pp. 148-154.

Keith Goatman; "Automated Detection of Microaneurysms"; Abstracts Reports; Jul. 10, 1997; pp. 1-6.

* cited by examiner

500

Legend

901 ✧ = TP of the automatic system.

902 ☐ = FP of the automatic system.

903 ◯ = FN of the automatic system.

904 △ = Missed in the candidate detection step.

905 ⬡ = FP of the second expert observer.

906 ◇ = FN of the second expert observer.

AUTOMATIC DETECTION OF RED LESIONS IN DIGITAL COLOR FUNDUS PHOTOGRAPHS

CROSS REFERENCE TO RELATED PATENT APPLICATION

This application claims priority to U.S. Provisional Application No. 60/666,868 filed Mar. 31, 2005, herein incorporated by reference in its entirety.

BACKGROUND

Diabetic retinopathy (DR) is the leading cause of blindness in the working population of the western world. It is an eye disease which in some form afflicts 17% of diabetic subjects five years after diagnosis of diabetes and 97% fifteen years after diagnosis. Early diagnosis through regular screening and timely treatment has been shown to prevent visual loss and blindness. Digital color fundus photography allows acquisition of fundus images (see 500 in FIG. 5) in a noninvasive manner which is a prerequisite for large scale screening.

In a DR screening program, the number of fundus images that need to be examined by ophthalmologists can be prohibitively large. The number of images without any sign of DR in a screening setting is typically over 90%. Therefore an automated system that can decide whether or not any signs suspicious for DR are present in an image can improve efficiency; only those images deemed suspect by the system would require examination by an ophthalmologist.

Signs of DR include red lesions such as microaneurysms and intraretinal hemorrhages, and white lesions, such as exudates and cottonwool spots. Red lesions are among the first unequivocal signs of DR. Therefore, their detection is critical for a pre-screening system.

Previously published methods for the detection of red lesions have focused on detecting microaneurysms in fluorescein angiography images of the fundus. In this type of image, the contrast between the microaneurysms and background is larger than in digital color images. However, the mortality of 1:222,000 associated with the intravenous use of fluorescein prohibits the application of this technique for large-scale screening purposes.

The detection method described by Spencer, Cree, Frame and co-workers employed a mathematical morphology technique that eliminates the vasculature from a fundus image yet left possible microaneurysm candidates untouched. Spencer, J. Olson, K. McHardy, P. Sharp, and J. Forrester, "An image-processing strategy for the segmentation and quantification in fluorescein angiograms of the ocular fundus," Computers and biomedical research, vol. 29, pp. 284-302, 1996. A. Frame, P. Undrill, M. Cree, J. Olson, K. McHardy, P. Sharp, and J. Forrester, "A comparison of computer based classification methods applied to the detection of microaneurysms in ophthalmic fluorescein angiograms," Computers in Biology and Medicine, vol. 28, pp. 225-238, 1998, all incorporated by reference in their entireties. It has also been applied, in a modified version, to high resolution red-free fundus images with a sensitivity of 85% and a specificity of 76% on a per image basis.

A number of other approaches for the detection of red lesions in color fundus images have also been described. A neural network has been used to detect both hemorrhages and exudates. Each image was divided into 20×20 pixel grids; these were then individually classified. The per image results showed a sensitivity of 88.4% and a specificity of 83.5%.

A recursive region-growing procedure has been applied to segment both the vessels and red lesions in a fundus image. Next, a neural network was used to detect the vessels exclusively. The objects that remain after removal of the detected vasculature are labeled as microaneurysms. The evaluation was carried out on 10×10 pixel grids and not for individual images or lesions. A sensitivity of 77.5% and specificity of 88.7% were reported.

Results of a commercially available automatic red lesion detection system have been released. However, their method was not described. The system had a sensitivity of 93.1% and specificity of 71.4% on a per patient basis. Because of the inadequacy of the aforementioned techniques, there exists a great need for a screening system that can identify lesions suspicious for Diabetic Retinopathy.

SUMMARY OF INVENTION

Provided is an automated method which can detect images containing red lesions with a very high sensitivity and a reasonable specificity. First, each image is preprocessed; next, candidate objects that may represent red lesions are extracted; and in the final stage, the probability for each candidate to represent a red lesion is estimated using a classifier and a large set of specifically designed features.

Other systems, methods, and aspects and advantages of the invention will be discussed with reference to the figures and to the detailed description of the preferred embodiments.

BRIEF DESCRIPTION OF THE FIGURES

The invention will be described by way of example, in the description of exemplary embodiments, with particular reference to the accompanying figures.

DETAILED DESCRIPTION

Figure 1:
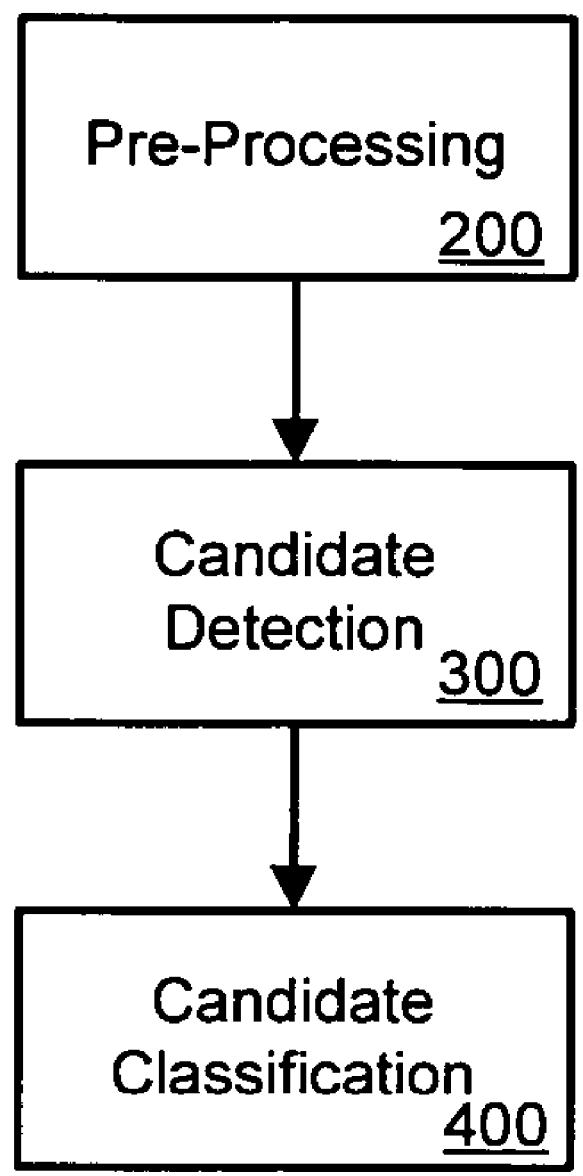
FIG. 1 shows an exemplary flow diagram outlining the general steps of the method.

Before the present systems and methods are disclosed and described, it is to be understood that the terminology used herein is for the purpose of describing particular embodiments only and is not intended to be limiting. While described below for use in detecting red lesions, the system and method for automatic detection of red lesions in digital color fundus images can be used for detection of other objects indicative of disease including, but not limited to, microaneurysms, dot hemorrhages, flame-shaped hemorrhages, sub-intimal hemorrhages, sub-retinal hemorrhages, pre-retinal hemorrhages, micro-infarctions, cotton-wool spots, exudates and drusen.

Definitions

As used in the specification and the appended claims, the singular forms "a," "an" and "the" include plural referents unless the context clearly dictates otherwise. Thus, for example, reference to "a lesion" includes mixtures of two or more such lesions, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data are provided in a number of different formats, and that these data, represent endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

An "image" is defined as a reproduction or imitation of the form of a person or thing, or specific characteristics thereof, in digital form. An image can be, but is not limited to, a JPEG image, a PNG image, a GIF image, a TIFF image, or any other digital image format known in the art. "Image" is used interchangeably with "photograph."

An "object" is defined as a tangible entity with defined borders contained within a digital photograph. An object can be a pixel or a group of pixels.

A "feature(s)" is defined as a group of one or more descriptive characteristics of objects that can discriminate for disease. A feature can be a numeric attribute.

A "set of features" is defined as a customized group of one or more descriptive characteristics of objects which most accurately classify objects indicative of eye disease.

A "threshold" is defined as a level, point, or value above which something is true or will take place and below which it is not or will not, such levels, points, or values include probabilities, sizes in pixels, and values representing pixel brightness.

"Thresholding" is defined as modifying pixels that contain a characteristic either above or below a selected threshold value.

An "abnormal object" is defined as an object in a retinal image representing a finding of disease, including, but not limited to, microaneurysms, dot hemorrhages, flame-shaped hemorrhages, sub-intimal hemorrhages, sub-retinal hemorrhages, pre-retinal hemorrhages, micro-infarctions, cotton-wool spots, and yellow exudates.

A "supervised procedure" is defined as a computer programming method wherein a program learns a function from examples of inputs and outputs.

A "seed coordinate" is defined as a location in an image that serves as a starting point for a region-growing procedure.

A "classifier" is defined as comprising mapping from unlabeled objects to labeled objects. Classifiers can have a form (for example, decision tree) plus an interpretation procedure (including how to handle unknowns, etc.). Some classifiers also provide probability estimates, which can be thresholded to yield an object decision thereby taking into account a utility function.

"Boosting" is defined as a general method for training an ensemble of classifiers with a view to improving performance relative to that of a single classifier.

"Support vector machines" are defined as learning machines that can perform binary classification (pattern recognition) and real valued function approximation (regression estimation) tasks. Support Vector Machines non-linearly map their n-dimensional input space into a high dimensional feature space. In this high dimensional feature space a linear classifier is constructed.

A "Spencer-Frame" system/method is defined as using a limited mathematical morphology based object detection system with features 1-13 from the feature list disclosed herein.

"$Image_{ORG}$" is defined as any image initially input into the disclosed method.

"$Image_{SC}$" is defined as any image that has been shade-corrected.

"$Image_{BG}$" is defined as a background image.

"Vasculature map" is defined as an image containing the disposition or arrangement of blood vessels in an organ or other part of an organism.

"$Image_{LESION}$" is defined as an image containing mainly non-elongated structures.

"$Image_{MATCH}$" is defined as an image that had a filter applied.

"$Image_{BIN-MM}$" is defined as a binary image resulting from Mathematical Morphology Based Candidate Object Detection.

"$Image_{PP}$" is defined as any image that has had bright lesions removed.

"$Image_{PROB}$" is defined as any image where the pixels in the image have been assigned a probability.

"$Image_{BIN-PC}$" is defined as a binary image resulting from Pixel Classification Based Candidate Object Detection.

"Mathematical morphology based candidate object detection" is defined as comprising at least one of the following steps:

a. applying a morphological transformation of a first image to discriminate circular from elongated regions producing a vasculature map;
 b. subtracting the vasculature map from the first image to produce a second image;
 c. applying a matched filter to the second image to enhance the contrast between background regions and abnormal regions producing a third image;
 d. applying a brightness threshold to the third image to produce a fourth image; and
 e. applying a region-growing procedure to the first image to generate a set of candidate objects.

"Supervised pixel classification based candidate object detection" is defined as comprising at least one of the following steps:

a. training a classifier with a supervised procedure using example pixels extracted from a labeled reference standard training set;
 b. obtaining pixel feature vectors from a first image comprising applying filters for determining pixel intensities or other characteristics of pixels at each pixel location or pixel region in the first image;
 c. automatically classifying each of a plurality of the first image pixels as foreground or background pixels;
 d. assigning a posterior probability of being a foreground pixel to each first image pixel according to the equation $p=n/k$, producing a second image;
 e. removing the second image pixels where the posterior probability is less than a probability threshold, producing a third image;
 f. removing any object in the third image with a size that is above a size threshold;
 g. applying a region-growing procedure to the first image to generate a set of candidate objects; and
 h. filling empty pixels within the grown objects of the set of candidate objects.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

Method

I. Image Preprocessing

To prepare fundus images for red lesion extraction, preprocessing is performed on the green-plane of the original RGB color image, $Image_{ORG}$. As red lesions have the highest contrast with the background in the green color plane information from the red and blue color planes are not used in this step.

a. Shade Correction

Figure 5:
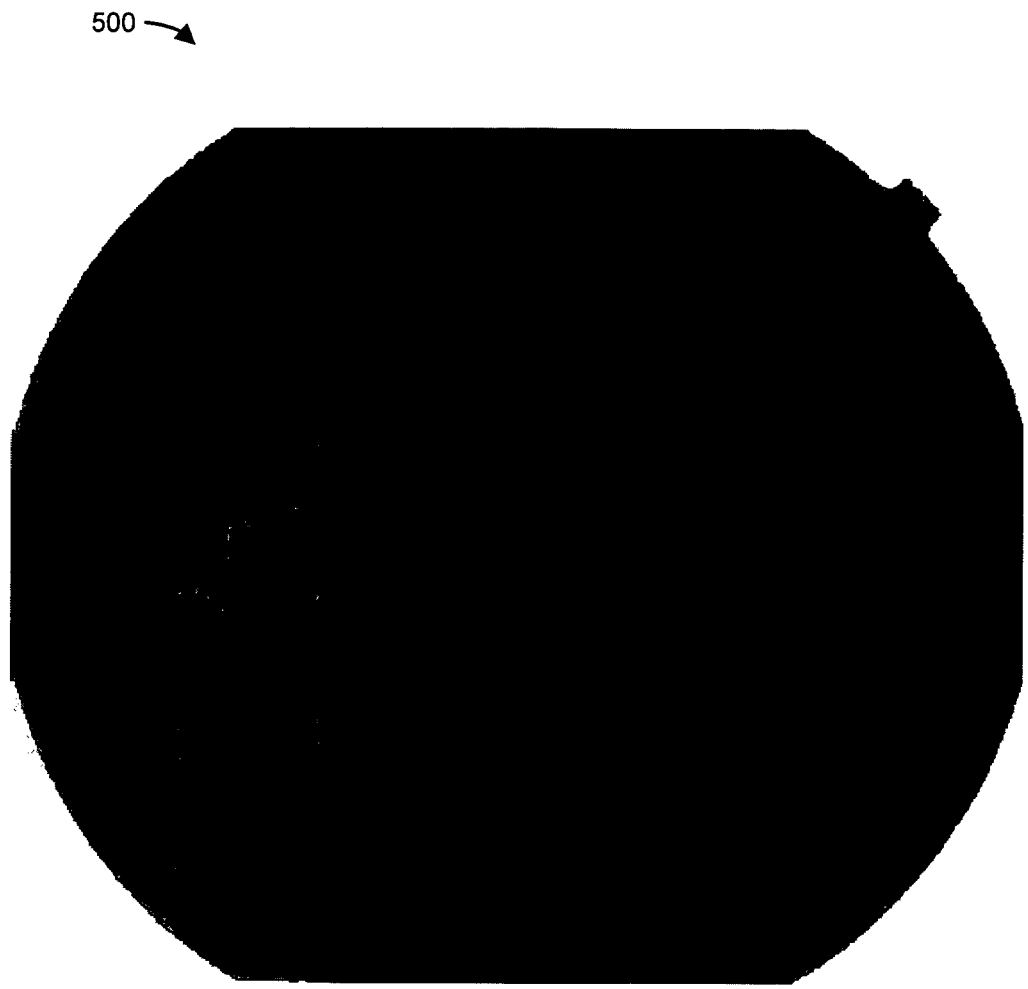
FIG. 5 shows a digital color fundus photograph containing red lesions.
Figure 6B:
FIG. 6b shows a fundus image after subtracting a median filtered version of the green plane large background gradients are removed.

Fundus images often contain an intensity variation in the background across the image, called "vignetting" (see FIG. 5). This effect can deteriorate the performance of the candidate selection system. Any slow gradients in the background of $Image_{ORG}$ can be removed, resulting in a "shade corrected" image $Image_{SC}$. This can be accomplished by estimating the background image $Image_{BG}$ and subtracting that from $Image_{ORG}$. $Image_{BG}$ can be produced by median filtering $Image_{ORG}$ with a 25×25 pixel kernel. The size of the median filter can be chosen such that it is wider than the widest blood vessel in the dataset of images. A typical result of the operation is shown in FIG. 6b.

b. Bright Lesion Removal

Bright pathologies can also appear in retinas affected by DR. These lesions can have well defined sharp edges. When they lie close together, small "islands" of normal retina are formed between them. These can be picked up as false positives (FPs) by the candidate object detection in the pixel classification based system in later steps. To prevent this, these bright pathologies can be removed as follows.

Figure 6D:
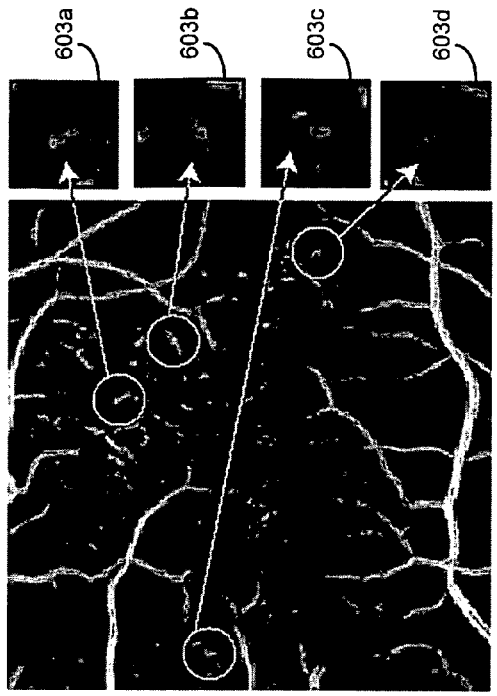
FIG. 6d shows the pixel classification result produced by the contrast enhancement step. The non-occluded parts of the hemorrhages are visible together with the vasculature and a number of red lesions.
Figure 6A:
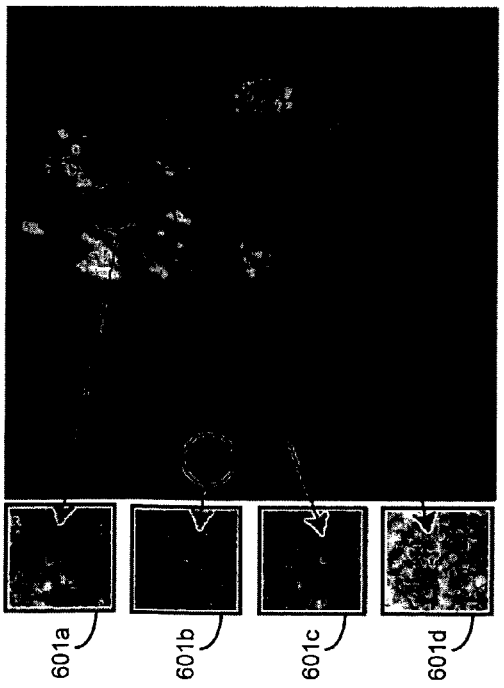
FIG. 6a shows part of the green color plane of a fundus image. Shown are segments of vasculature and several red lesions. The bright lesions called exudates are also a sign of diabetic retinopathy. Circles mark the location of some of the red lesions in the image.
Figure 6C:
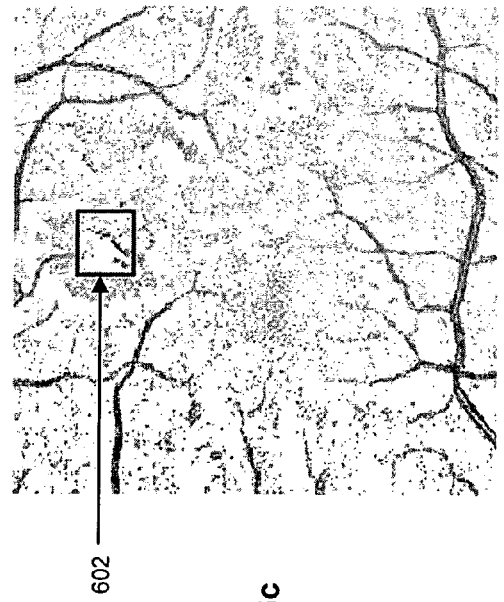
FIG. 6c shows a fundus image where all pixels with a positive value are set to zero to eliminate the bright lesions in the image. Note that the exudates often partially occlude red lesions. The non-occluded parts of the red lesions show up clearly in this image. An example of this is marked with a rectangle.

The shade corrected image $Image_{SC}$ has negative values for all pixels which have an intensity lower than the background. By removing all pixels with a positive value from the image, bright pathologies no longer influence the later analysis. All pixels in $Image_{SC}$ with a positive value can be set to zero resulting in a preprocessed image $Image_{PP}$. FIG. 6c shows a fundus image where all pixels with a positive value are set to zero to eliminate the bright lesions in the image. Note that the exudates often partially occlude red lesions. The non-occluded parts of the red lesions 602 show up clearly in this image. An example of this is marked with a rectangle.

II. Candidate Detection

Next, objects that are potential red lesions are detected in the pre-processed images. These objects can be called candidate objects.

a. Mathematical Morphology Based Candidate Detection

After the image pre-processing stage, the actual candidate objects can be extracted from $Image_{SC}$. To discriminate between circular, non-connected red lesions and the elongated vasculature, a morphological top-hat transformation can be used. The method is not limited to the use of the top-hat transformation; other morphological transformations which together achieve the same result as the morphological top-hat transformation can be used. This operation is based on morphologically opening the image with a linear structuring element at different orientations. Twelve rotated structuring elements with a length of 9 pixels and width of 1 pixel can be used with a radial resolution of 15°. The method is not limited to the use of twelve rotated structuring elements or a length of 9 pixels and a width of 1 pixel. The method is also not limited to a radial resolution of 15°. As the resolution of an image increases the optimal length and radial resolution can increase. The length of the structuring element should be such that it is larger than the biggest red lesion present in the set. A length of 9 pixels gave the best balance between vessel segmentation and red lesion detection for the set. In each of the 12 opened images, only those parts of the vasculature in which the linear structuring element can fit remain. By taking the maximum pixel value at each pixel location in all 12 images, a map of only the vasculature can be obtained. This vasculature map can be subtracted from $Image_{SC}$, resulting in an image, $Image_{LESION}$, containing mainly non-elongated structures such as, but not limited to, red lesions.

To enhance the contrast between background and red lesions in $Image_{LESION}$, a matched filter can be used. The matched filter is a 2D Gaussian with σ at least 1 pixel. The method is not limited to such a matched filter or such a scale; any filter that achieves similar results can be used. Next the filtered image, $Image_{MATCH}$, can be thresholded to produce a binary image $Image_{BIN-MM}$. The threshold can be fixed at a certain level above the modal value of the image $Image_{MATCH}$. In this implementation, 4 was used as the brightness threshold. This method is not limited to the use of 4 as the brightness threshold. The brightness threshold can comprise values from 2 to 6. For example, brightness threshold values can be 2, 3, 4, 5, and 6. The extracted binary objects are not a good representation of the pathologies as found in $Image_{ORG}$. A region growing procedure can be used to grow back the original pathologies, in the $Image_{MATCH}$. The darkest pixel under each of the binary objects can serve as a starting point.

The estimated background image $Image_{BG}$ obtained in the preprocessing step can be used to find the threshold t for the region growing procedure as follows:

$$t = i_{seed} - x(i_{seed} - i_{bg}), \quad (1)$$

where $i_{seed}$ is the intensity at the starting position, i.e., the pixel under the binary object with the lowest gray value. Then $i_{bg}$ is the intensity of the same pixel in the background image and $X \in [0, 1]$. Here $x=0.5$. Growing can start in the seed pixel and stop when no more connected pixels below the threshold can be found. The grown objects together can form a candidate object set. This method is not limited to the use of this type of region growing procedure; alternative segmentation methods that achieve similar results can be used.

b. Pixel Classification Based Candidate Detection

A limitation of the previously described candidate extraction technique is that any red lesions which are larger than the linear structuring element cannot be detected. When the length of the structuring element is increased to be able to detect larger objects, the vessel segmentation deteriorates leading to more spurious candidate objects being detected on the vasculature. This limitation can be removed by using a pixel classification based method. This approach can detect larger candidate objects and reduces the number of spurious candidate objects on the vessels by integrating a vessel segmentation technique with red lesion detection. Both vasculature and possible red lesions can be extracted at once, and subsequently the vasculature can be separated from the red lesion candidate objects.

The digital color images used have a relatively low resolution, such that small red lesions typically have areas as low as four pixels, with relatively low contrast. Such is the image quality of data currently used routinely for DR screening. With pixel classification the contrast between foreground pixels (red lesions and vasculature) and pixels in the background can be improved such that a global threshold can be used to extract all relevant objects in the image.

Pixel classification is a supervised method, so it needs to be trained using example pixels. Each of the example pixels was extracted from a training set for which a labeled reference standard is available. All pixels in the training set are thus assigned a label and a feature vector. A classifier can now establish a decision boundary in the feature space which optimally separates the two classes (i.e., foreground and background pixels).

A large number of sample pixels of red lesions, vasculature as well as background pixels are needed for training. A set of 40 fundus images, not used in the development or testing of any other part of the system, provided the training pixels. In all of the images the vasculature and red lesions were manually segmented. Each of these images was preprocessed as described before training the pixel classification procedure. This training procedure needs to be completed only once but can be performed multiple times; after it has finished, the system is ready to process unseen images.

An important observation is the similarity, on a pixel level, in color and response to first and second order Gaussian filters for the red lesions and the vasculature. To obtain the feature vectors, filter outputs at each pixel location of $Image_{PP}$ can be used. These filters comprise all Gaussian derivatives up to and including second order at scales σ=1, 2, 4, 8, 16 pixels. Also the pixel intensities taken from $Image_{PP}$ were added to the feature vector. A kNN classifier produced the best results with k=55. This method is not limited to the use of a kNN classifier, any classifier known in the art can be used including, but not limited to a linear discriminant classifier, a quadratic discriminant classifier, support vector machines or boosted classifiers.

The kNN classifier (with k>1) allows for soft-classification in which each pixel is assigned a probability of it being a foreground pixel. To accomplish this, all k neighbors in the feature space of a query pixel can be examined. When n neighbors were labeled as being a foreground pixel, the posterior probability that the query pixel is a foreground pixel itself p was determined by $$p = n/k \quad (2)$$

For the kNN classifier the optimized implementation as provided by Arya et al., "An Optimal Algorithm for Approximate Nearest Neighbor Searching in Fixed Dimensions," Journal of the ACM, vol. 45, no. 6, pp. 891-923, 1998 herein incorporated by reference in its entirety, can be used. FIG. 6a shows part of the green plane of a fundus image. Some red lesions 601 a, b, c, d, are indicated. The probabilistic map of FIG. 6a is shown in FIG. 6d, with some red lesions 603 a, b, c, d indicated.

Figure 7A:
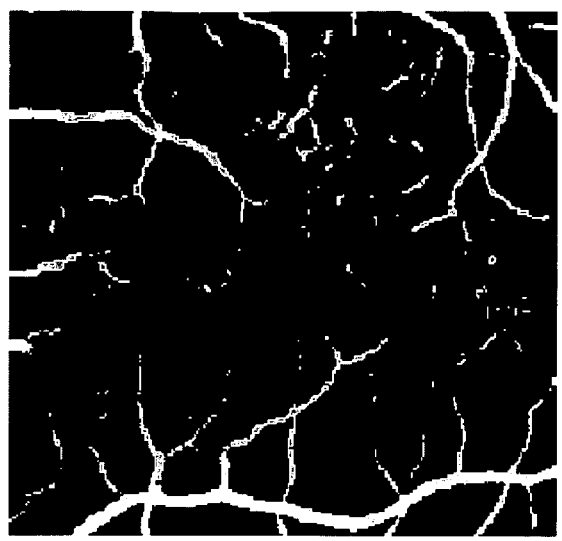
FIG. 7a shows the thresholded probability map.
Figure 7B:
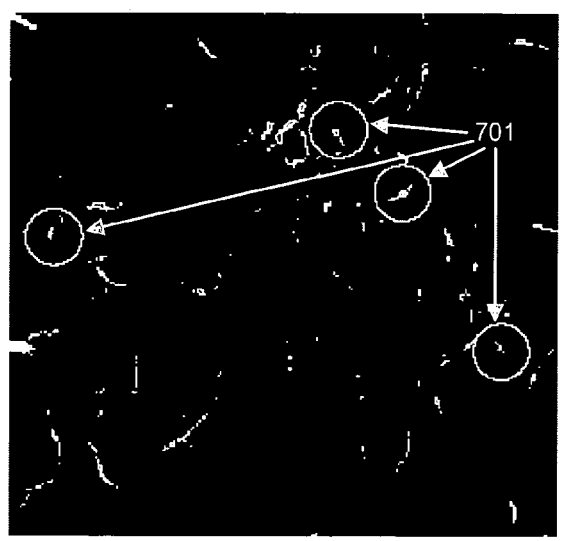
FIG. 7b shows the remaining objects after connected component analysis and removal of the large vasculature. The same red lesions as in FIG. 6a are indicated with a circle.
Figure 7C:
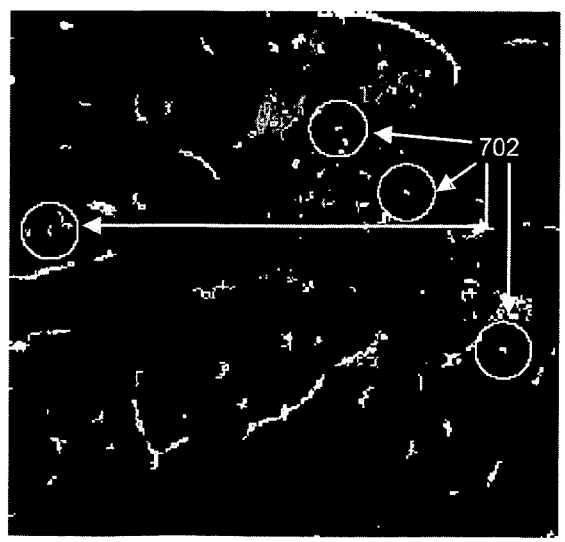
FIG. 7c shows the shape and size of the extracted objects in FIG. 7b does not correspond well with the actual shape and size of the objects in the original image. A final region growing procedure is used to grow back the actual objects in the original image which are shown here. The same red lesions as in FIG. 6a are indicated with a circle.

To extract possible candidate locations, the probabilistic map produced by the pixel classification can be thresholded. To determine this probability threshold, the maximum pixel value in the probability map under each of the objects marked in the ground truth can be examined. This can give an indication of the maximum amount of objects that can be detected at a certain probability threshold. A good balance can be achieved between the number of detected spurious objects and the number of detected red lesions with a probability threshold of 0.4. The method is not limited to the use of a probability threshold at 0.4. The probability threshold can comprise values from 0 to 1. For example, probability threshold values can be 0, 0.1, 0.2, 0.3, 0.4, 0.5, 0.6, 0.7, 0.8, 0.9, and 1. After thresholding, a binary image containing any red lesions and a large part of the vascular tree can be obtained. Because red lesions in general do not appear on larger (visible) vessels, they are disconnected from the vasculature. To obtain possible candidate locations, connected component analysis can be applied on the binary objects. Any object which was too large to be a red lesion can be removed. To determine a size threshold for this operation, a histogram can be made of the sizes of all lesions in the reference standard segmentation of the training set. A size threshold of 300 pixels was found to include 98% of all red lesions for images of the resolution used. Most of the vasculature is connected, forming objects larger than 300 pixels and can thus be removed by this step. The method is not limited to the use of 300 pixels. For example, the method can comprise size threshold values from 30 to 600, however the size threshold can be any size necessary, depending on the resolution of the image. For example, size threshold values can be 30, 50, 150, 200, 250, 300, 350, 400, 450, 500, 550, 600, 650, 700, 750, and so on. What remains are a number of small vessel fragments and those red lesions not connected to the vasculature. In FIG. 7(a,b,c), a binary example image and the remaining connected components are shown. FIG. 7a, depicts an exemplary binary image. In FIG. 7b, lesions 701 are shown after connected component analysis and removal of the large vasculature. In FIG. 7c, lesions 702 are shown after a region growing procedure.

As with the mathematical morphology based approach the extracted objects are not a good representation of the actual pathologies and objects in the original image. Therefore, the same region growing technique as described earlier can be applied to Image$_{SC}$ to determine the actual shape of the objects.

The objects which are produced by the region growing procedure can then be post-processed such that any empty pixels in the grown objects are filled. This post-processing can be done to facilitate feature extraction. The post-processed objects together form a set of candidate objects.

c. Hybrid Candidate Object Detection

Both the pixel classification and the mathematical morphology based system exhibit similar performance in terms of detected lesions. However, when the candidates of both systems are combined, a higher number of true positive (TP) candidate objects can be detected. The combination can be done by putting all candidate objects in a set. Then all objects can be checked to see if they overlap with another object in the set. In case of overlap, one of the objects can be removed. When both candidate detection systems detect the same lesion, it does not matter which object is removed because the segmentation method used in both approaches is the same. Overlap also often occurs when a region growing seed point is placed in a normal area of the retina (e.g., due to noise), the region growing procedure grows into neighboring red lesions and vessels. To exclude these relatively large spurious objects, the larger of two overlapping objects can be removed.

III. Candidate Classification System

The candidate detection step results in a set of candidate objects. The purpose of the candidate classification system is to classify each of these objects as either an abnormal object, which can be a red lesion, or a normal object, which can be a non-red lesion. To accomplish this, another classifier can be trained using example objects. These example objects are first extracted from a training set using the candidate object detection methods described earlier. Using the reference standard segmentation of the training set, each of the example objects can be appropriately labeled. The kNN classifier showed the best performance. This method is not limited to the use of a kNN classifier; any classifier known in the art can be used including, but not limited to, a linear discriminant classifier, a quadratic discriminant classifier, support vector machines or techniques such as boosting.

Features

A total of thirteen different candidate object features were proposed by Frame et al., "A comparison of computer based classification methods applied to the detection of microaneurysms in ophthalmic fluorescein angiograms," Computers in Biology and Medicine, vol. 28, pp. 225-238, 1998 herein incorporated by reference in its entirety, for use with the Spencer-Frame System. The features can be divided into two groups: shape features (1-4) and pixel intensity features (5-13). With just these thirteen features, system performance is limited.

Several new features are disclosed to improve performance. To determine what features can be added, the behavior of the system using the Spencer-Frame feature set was observed. These showed a significant number of FP objects on the vasculature. To counter this, Gaussian filterbank outputs (Feature 19) were added to the feature set as well as a feature which can determine if an object is on an elongated structure (Feature 20). As fluorescein angiograms do not contain color, color features were not used in the Spencer-Frame system. Since the color of the images is an extra source of information, features 15-18 were added. Feature 14 eliminates elongated structures. Feature 21 can improve the detection of larger circular objects. The feature set is listed below. Some features can be obtained at several image scales σ. The method is not limited to the feature list below. For example, larger scales can be used for images with higher image resolutions.

1. The area $\alpha = \Sigma_{j \in \Omega} 1$ where $\Omega$ is the set of pixels in the candidate.

2. The perimeter p which is approximated using the chaincodes, see H. Freeman, "On Encoding Arbitrary Geometric Configurations," IRE Transactions on Electronic Computers, vol. 10, pp. 260-268, 1961 herein incorporated by reference in its entirety, of the object. The number of odd $n_o$ and even $n_e$ chaincodes are counted then $p = n_o \sqrt{2} + n_e$.

3. The aspect ratio r=l/w. l is the length of the largest and w of the second largest eigenvector of the covariance matrix of the object.

4. The circularity $$c = \frac{p^2}{4\pi a}.$$

5. The total intensity of the object in the original green plane image $i_{green} = \Sigma_{j \in \Omega} g_j$ where $g_j$ represents the j-th pixel in the original green plane image.

6. The total intensity of the object in the shade corrected image $i_{sc} = \Sigma_{j \in \Omega} s_j$ where $s_j$ represents the j-th pixel in the shade corrected image.

7. The mean intensity under the object in the original green plane image $m_{green} = i_{green}/\alpha$.

8. The mean intensity under the object in the shade corrected image $m_{sc}=i_{sc}/\alpha$.

9. The normalized intensity in the original green plane image $$NI_{green} = \frac{1}{\sigma}(i_{green} - x)$$

where $\sigma$ and x are the standard deviation and average pixel value of $I_{bg}$.

10. The normalized intensity in the shade corrected image $$NI_{sc} = \frac{1}{\sigma}i$$

11. The normalized mean intensity in the original image $$NM_{green} = \frac{1}{\sigma}(m_{green} - x).$$

12. The normalized mean intensity in the shade corrected image $$NM_{sc} = \frac{1}{\sigma}m_{green}$$

13. The intensity of the region growing seed in the match filtered image $I_{match}$.

14. The compactness $$v = \sqrt{\frac{\sum_{j=1}^{n} d_j - \overline{d}}{n}}$$

where $d_j$ is the distance from the centroid of the object to its j-th boundary pixel and d is the mean of all the distances from the centroid to all the edge pixels. Here n is the number of edge pixels.

15. The difference between the mean pixel values inside the object and mean values in a circular region centered on the object in the red plane from the RGB color space $$rd(j) = \frac{1}{n_\Omega}\Sigma_{j\in\Omega}R_j - \frac{1}{n_\Theta}\Sigma_{j\in\Theta}R_j.$$

Here $\Omega$ is the set of pixels in the candidate and $\Theta$ is the set of pixels included in the circular region excluding the pixels in $\Omega$. $R_j$ is the j-th pixel in the red image plane. The diameter of the circular region is determined by taking the maximum distance from the object centroid to any of the edges of an axis aligned bounding box and adding three. $n_\Omega$ and $n_\Theta$ are the number of pixels in $\Omega$ and $\Theta$ respectively.

16. As feature 15 but extracted from the green image plane.

17. As feature 15 but extracted from the blue image plane.

18. As feature 15 but extracted from the hue image plane taken from the HSI color space.

19. The mean and standard deviation of filter outputs under the object. The filters consist of the Gaussian and its derivatives up to second order at scales $\sigma=1,2,4,8$ pixels. The total amount of features obtained in this way is $2(4\times6)=48$.

20. The average value under the object of the absolute difference of the two largest eigenvalues of the Hessian tensor. The scale $\sigma=2$ is used for the Gaussian partial derivatives that make up the Hessian.

21. The average output under the object of an iris filter as described in H. Kobatake and Y. Yoshinaga, "Detection of Spicules on Mammogram Based on Skeleton Analysis," IEEE Transactions on Medical Imaging, vol. 15, no. 3, pp. 235-245, 1996 herein incorporated by reference in its entirety, used on $I_{sc}$ with a minimum circle radius of 4, maximum radius of 12 and 8 directions.

22. The Determinant and eigenvalues of the Hessian matrix for each pixel.

In some cases, the use of feature selection schemes can help improve the performance of a classifier. Several feature selection methods can be used on the feature set defined above. The method is not limited to the use of a feature selection scheme; the method can use any or all of the features disclosed.

IV. EXAMPLES

Method

Figure 2:
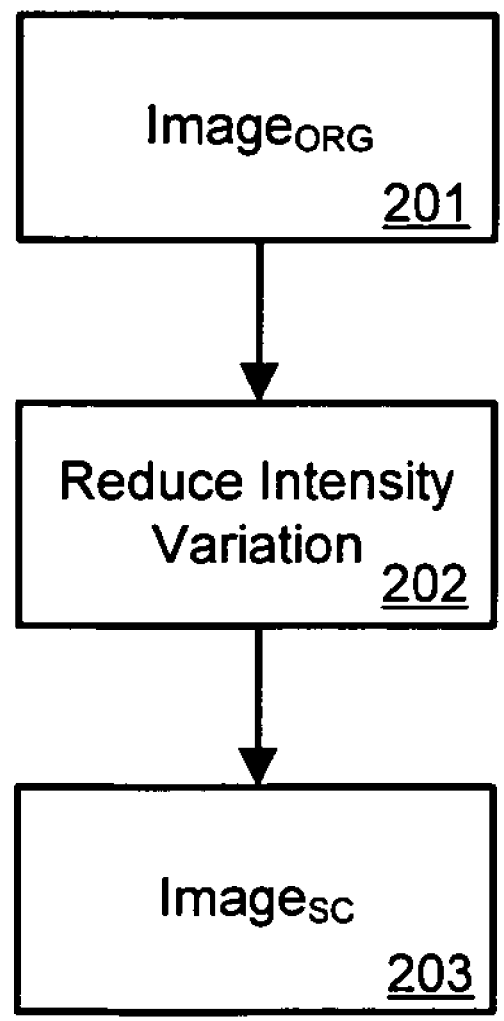
FIG. 2 shows an exemplary flow diagram outlining the steps of the Image Pre-Processing step.

Referring to FIG. 1, an exemplary method 100 is shown. The first step is an image pre-processing step 200, followed by a candidate detection step 300, and finally a candidate classification step 400. Referring to FIG. 2, the image pre-processing step 200, converts an Image$_{ORG}$ 201 into an Image$_{SC}$ 203 by reducing intensity variation at 202.

Figure 3A:
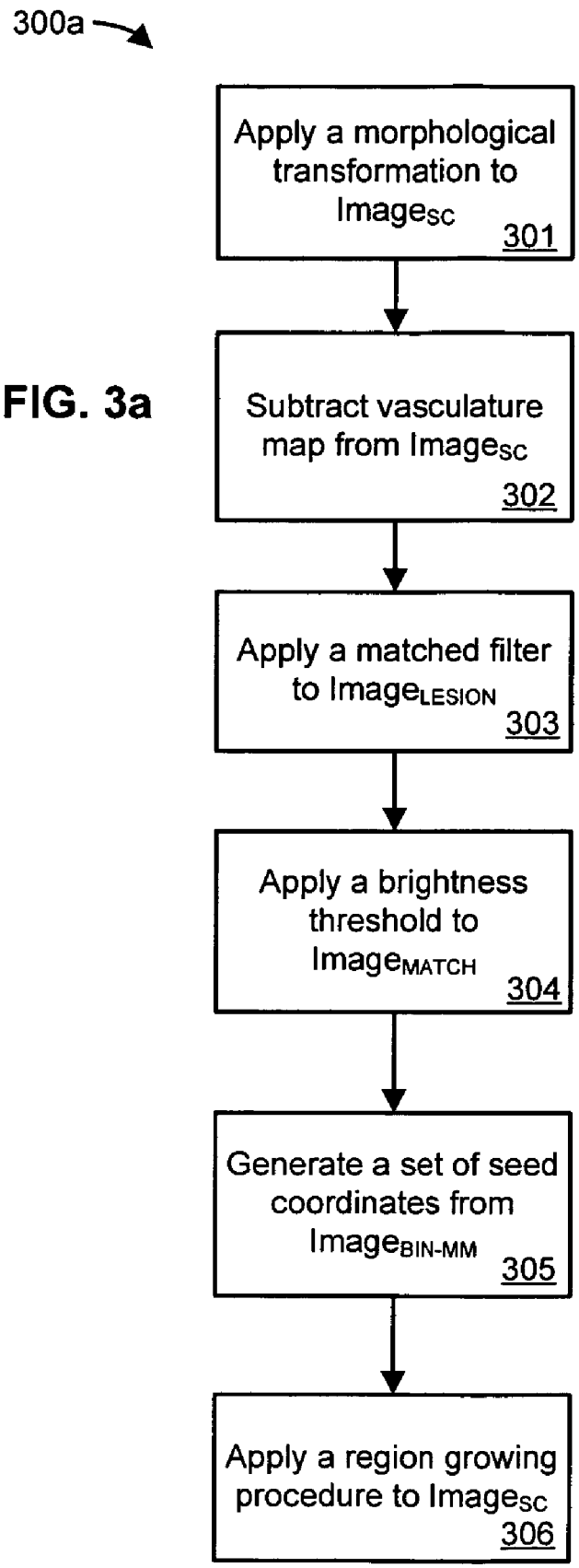
FIG. 3a shows an exemplary flow diagram outlining the steps of the Mathematical Morphology Based Candidate Detection Step.

Referring to FIGS. 3a, b, and c, the candidate detection step 300, can be performed in three ways. The candidate detection step 300 can be performed as a Mathematical Morphology based step as in FIG. 3a (300a), as a Pixel Classification based step as in FIG. 3b (300b), or a hybrid of Pixel Classification and Mathematical Morphology as in FIG. 3c (300c).

Referring to FIG. 3a, a morphological transformation is applied to the Image$_{SC}$ at block 301, producing a Vasculature Map. The Vasculature Map is subtracted from the Image$_{SC}$ at block 302, to produce an Image$_{LESION}$. A matched filter is applied to the Image$_{LESION}$ at block 303, producing an Image$_{MATCH}$. A brightness threshold is applied to the Image$_{MATCH}$ at block 304, producing a binary image, Image$_{BIN-MM}$. A set of Seed Coordinates 306 is generated from the Image$_{BIN-MM}$ at block 305. A region-growing procedure using the Seed Coordinates is applied to Image$_{SC}$ at block 306 to generate a Final Set of Candidate Objects.

Figure 3B:
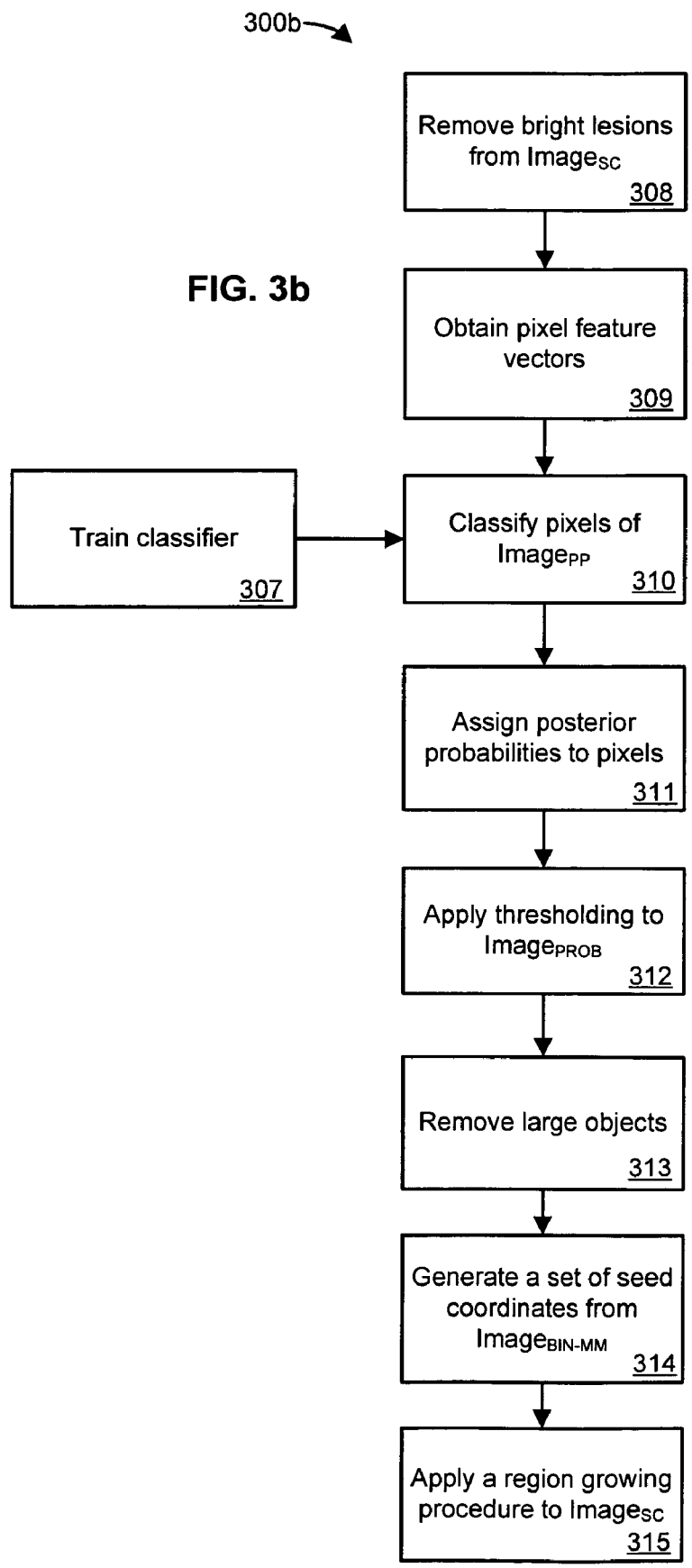
FIG. 3b shows an exemplary flow diagram outlining the steps of the Pixel Classification Based Candidate Detection Step.

Referring to FIG. 3b, an Untrained Classifier is trained based off of a Training Set, producing a Trained Classifier at block 307. Bright lesions are removed from the Image$_{SC}$ at block 308, producing an Image$_{PP}$. Pixel feature vectors are obtained from the Image$_{PP}$ at block 309. The Trained Classifier classifies the pixels of the Image$_{PP}$ as foreground pixels or background pixels at block 310, producing a probability map at block 311, Image$_{PROB}$, of posterior probabilities of a pixel being a foreground or a background pixel. At block 312 the Image$_{PROB}$ is thresholded to produce a binary image, Image$_{BIN-PC}$. Large objects are removed from Image$_{BIN-PC}$ at block 313 and a set of Seed Coordinates is generated from the Image$_{BIN-PC}$ at block 314. A region-growing procedure using the Seed Coordinates is applied to Image$_{SC}$ at block 315 to generate a Final Set of Candidate Objects.

Figure 3C:
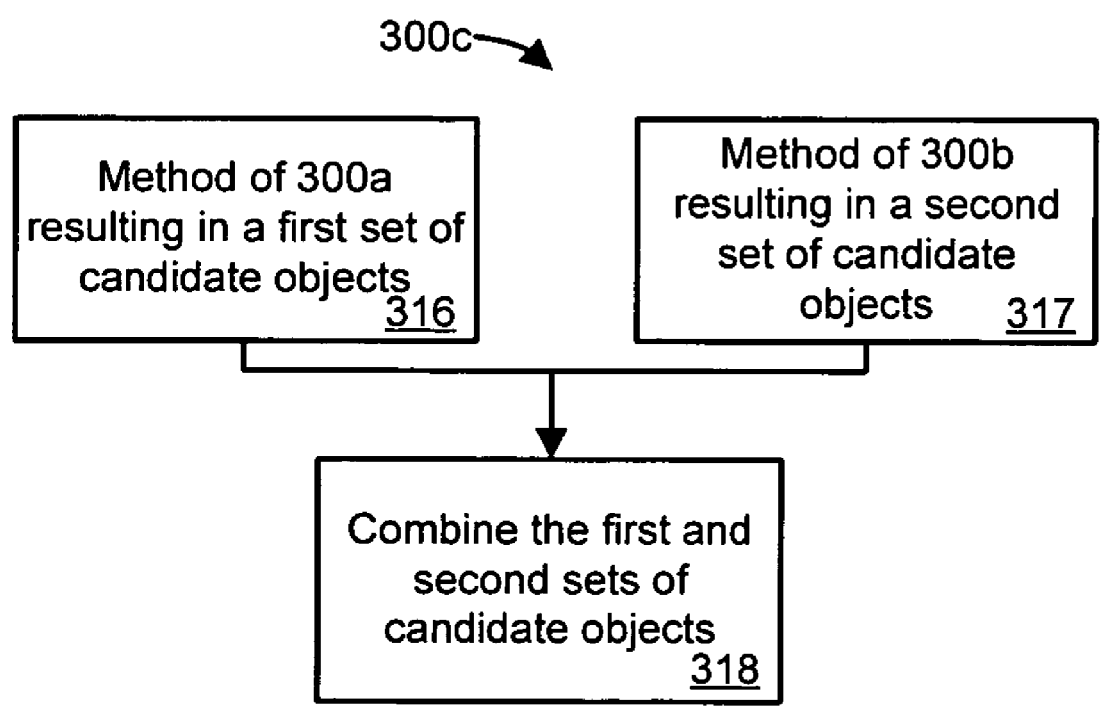
FIG. 3c shows an exemplary flow diagram outlining the steps of the hybrid Candidate Detection Step.

Referring to FIG. 3c, the mathematical morphology method of 300a can be performed as described above except the region-growing procedure using the Seed Coordinates as applied to Image$_{SC}$ generates a First Set of Candidate Objects. The pixel classification method of 300b can be performed as described above except that the region-growing procedure using the Seed Coordinates as applied to Image$_{SC}$ generates a Second Set of Candidate Objects. The First Set of Candidate Objects and the Second Set of Candidate Objects can be combined at block 318. The combined Sets of Candidate objects form a Final Set of Candidate Objects. Methods 300a and 300b can be performed concurrently or in any order in the same or different computing environments.

Figure 4:
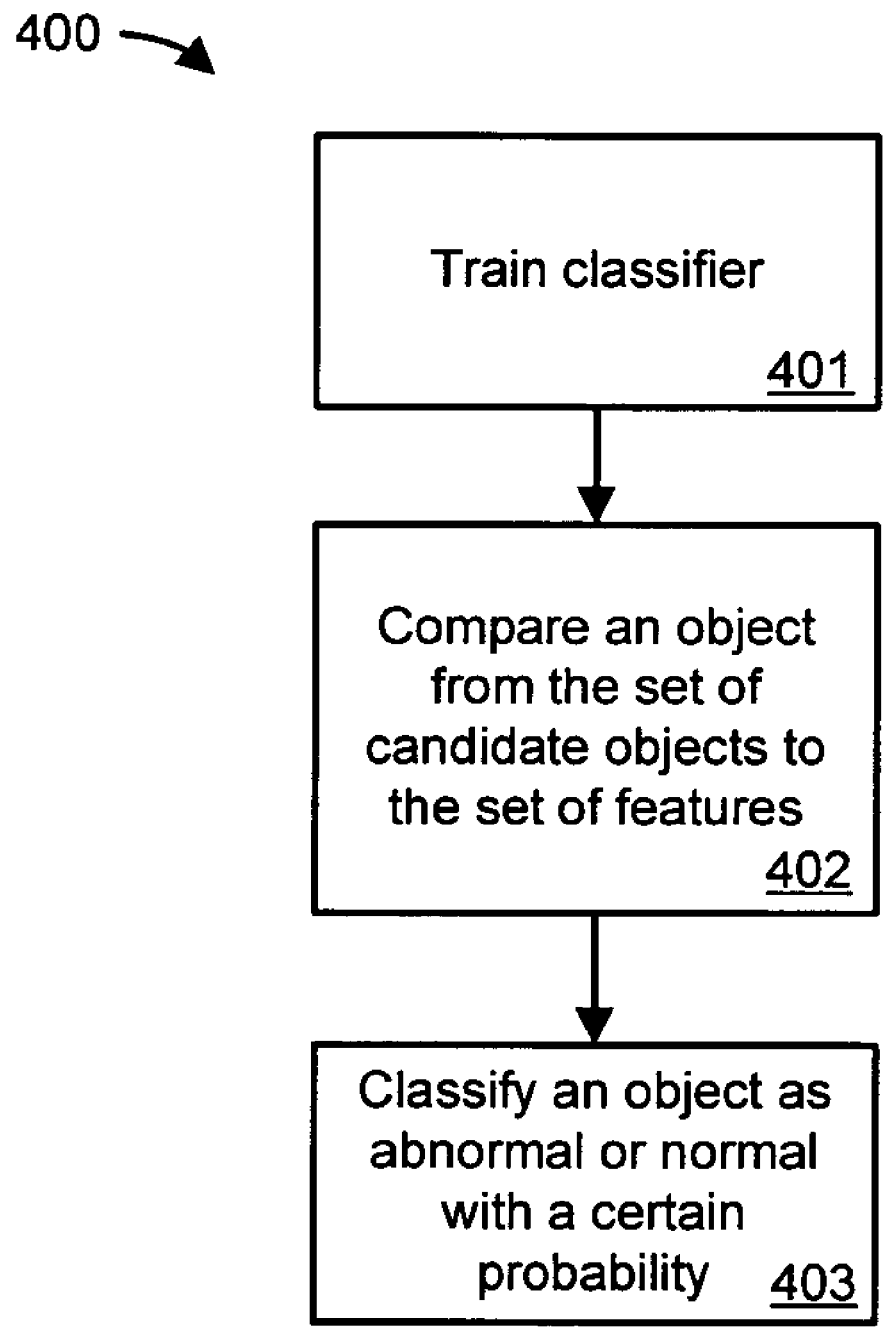
FIG. 4 shows an exemplary flow diagram outlining the Candidate Classification step.

Referring to FIG. 4, candidate classification 400, an Untrained Classifier can be trained based off of a Training Set at block 401, producing a Trained Classifier. Each object in the Set of Candidate Objects can be compared to the Set of Features by the Trained Classifier at block 402 and each object can be classified as an abnormal object with a certain probability or a normal object with a certain probability at block 403.

Exemplary Computing System

Figure 10:
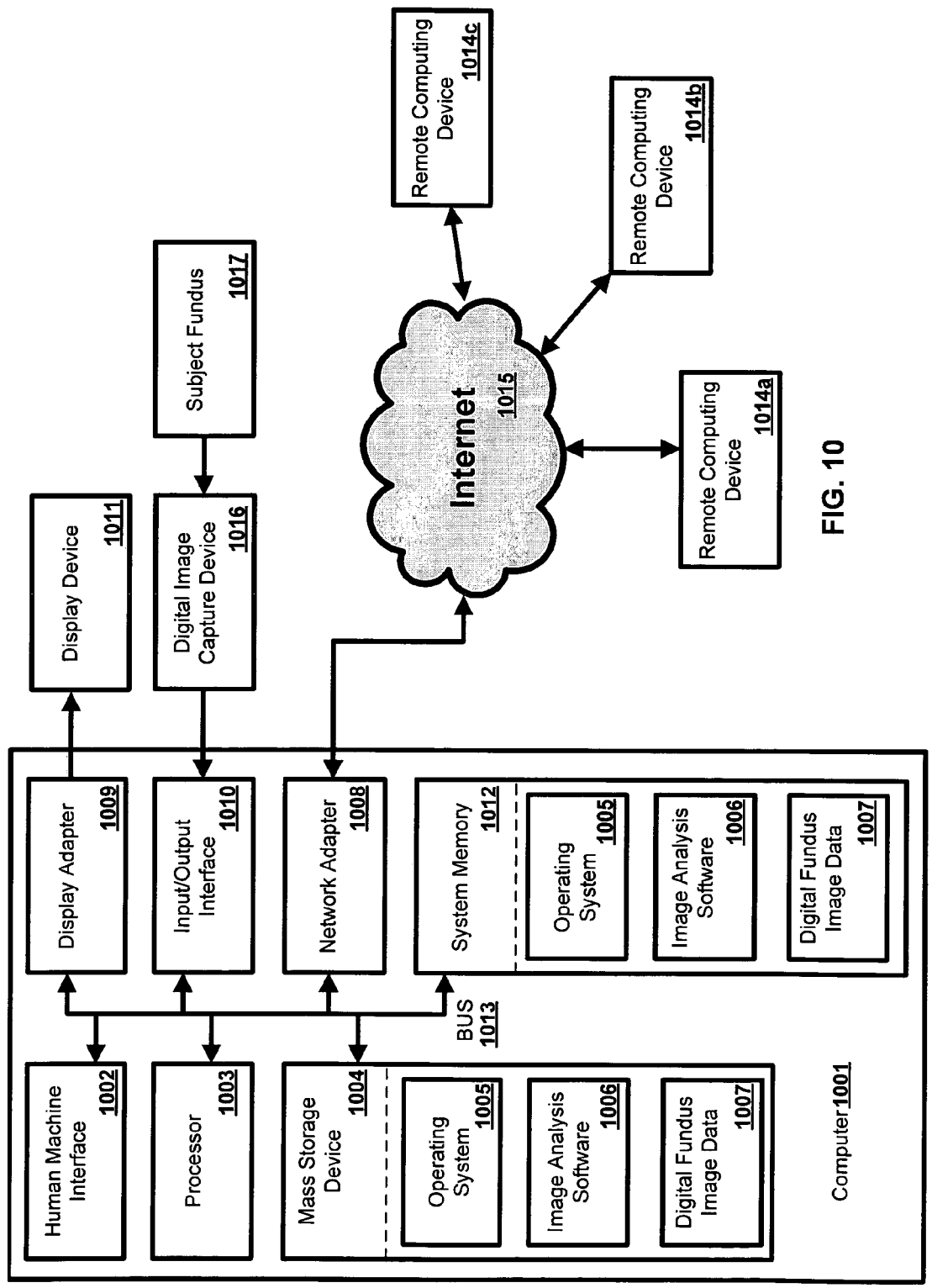
FIG. 10 shows an example of a computer based system implementing the disclosed method.

FIG. 10 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 1001. The components of the computer 1001 can include, but are not limited to, one or more processors or processing units 1003, a system memory 1012, and a system bus 1013 that couples various system components including the processor 1003 to the system memory 1012.

The system bus 1013 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 1013, and all buses specified in this description can also be implemented over a wired or wireless network connection and each of the subsystems, including the processor 1003, a mass storage device 1004, an operating system 1005, image analysis software 1006, digital fundus image data 1007, a network adapter 1008, system memory 1012, an Input/Output Interface 1010, a display adapter 1009, a display device 1011, a human machine interface 1002, and a digital image capture device 1016, can be contained within one or more remote computing devices 1014a,b,c at physically separate locations, connected through buses of this form, in effect implementing a fully distributed system.

The computer 1001 typically includes a variety of computer readable media. Such media can be any available media that is accessible by the computer 1001 and includes both volatile and non-volatile media, removable and non-removable media. The system memory 1012 includes computer readable media in the form of volatile memory, such as random access memory (RAM), and/or non-volatile memory, such as read only memory (ROM). The system memory 1012 typically contains data such as digital fundus image data 1007 and/or program modules such as operating system 1005 and image analysis software 1006 that are immediately accessible to and/or are presently operated on by the processing unit 1003.

The computer 1001 may also include other removable/non-removable, volatile/non-volatile computer storage media. By way of example, FIG. 10 illustrates a mass storage device 1004 which can provide non-volatile storage of computer code, computer readable instructions, data structures, program modules, and other data for the computer 1001. For example, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 1004, including by way of example, an operating system 1005 and image analysis software 1006. Each of the operating system 1005 and application software 1006 (or some combination thereof) may include elements of the programming and the application software 1006. Digital fundus image data 1007 can also be stored on the mass storage device 1004. Digital fundus image data 1007 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 1001 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 1003 via a human machine interface 1002 that is coupled to the system bus 1013, but may be connected by other interface and bus structures, such as a parallel port, game port, or a universal serial bus (USB).

Digital fundus image data 1007 can be obtained by using a digital image capture device 1016 to obtain a digital image of a subject fundus 1017. A digital image capture device 1016 can include, but is not limited to, a digital still image camera, a video capture card, a digital video camera, and the like. The digital fundus image data 1007 generated by a digital image capture device 1016 can enter the computer 1001 via the input/output interface 1010. The digital fundus image data 1007 can be stored in mass storage device 1004 and transferred to system memory 1012 as digital fundus image data 1007 to be used in image analysis software 1006. Digital fundus image data 1007 can also be obtained from other storage sources and transferred into the computer 1001 via the input/output interface or removable computer readable media.

A display device 1011 can also be connected to the system bus 1013 via an interface, such as a display adapter 1009. A computer 1001 can have more than one display adapter 1009 and a computer 1001 can have more than one display device 1011. For example, a display device can be a monitor, an LCD (Liquid Crystal Display), or a projector. In addition to the display device 1011, other output peripheral devices can include components such as speakers (not shown) and a printer (not shown) which can be connected to the computer 1001 via Input/Output Interface 1010.

The computer 1001 can operate in a networked environment using logical connections to one or more remote computing devices 1014*a,b,c*. By way of example, a remote computing device can be a personal computer, portable computer, a server, a router, a network computer, a peer device or other common network node, and so on. Logical connections between the computer 1001 and a remote computing device 1014*a,b,c* can be made via a local area network (LAN) and a general wide area network (WAN). Such network connections can be through a network adapter 1008. A network adapter 1008 can be implemented in both wired and wireless environments. Such networking environments are commonplace in offices, enterprise-wide computer networks, intranets, and the Internet 1015.

For purposes of illustration, application programs and other executable program components such as the operating system 1005 are illustrated herein as discrete blocks, although it is recognized that such programs and components reside at various times in different storage components of the computing device 1001, and are executed by the data processor(s) of the computer. An implementation of image analysis software 1006 may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices Implementation A set of 40 images (Set 1) was used to train a kNN classifier in the first candidate object extraction step. A second set of 100 images (Set 2) was used to train and test the complete system. All of the images in both sets were acquired digitally.

A. Set 1

Set 1 is a publicly available database of 40 manually segmented fundus images. All the vasculature has been manually segmented. All red lesions were manually segmented and added to the existing segmentation.

B. Set 2

Set 2 contains a total of 100 images and was used to train and test the presented system. Because screening data typically contain less than 10% pathological images, Set 2 was not assembled using just screening images. Of the images in Set 2, 74 were obtained at a tertiary referral hospital. A team of two ophthalmologists (MDA and MS), both retinal disease specialists, selected 37 images with and 37 images without pathology. These images were captured using a Topcon® TRC-50 at 45° field of view. The remaining 26 images were taken from a DR screening program in the Netherlands. These images were captured using a Canon® CR5 non-mydriatic 3CCD camera at 45° field of view. Of these images 13 contained red lesions, and 13 showed no visible red lesions. Some patients have two images included in the set, but these were never of the same eye.

All images were JPEG compressed. This lossy image compression format is not ideal for image processing but is commonly used in a screening setting. The size of the images is 768×576 pixels and the field of view is approximately 540 pixels in diameter. All personally identifiable information was stripped from all the images so that only the raw image data was available for this research.

The team separately annotated the entire set of 100 images. The annotation was performed by manually marking all pixels of a red lesion for every possible red lesion in the set. All 100 images were annotated in random order. The annotation of the first ophthalmologist was taken as the reference standard. According to the reference standard, a total of 55 images from the entire set contained pathologies. In these 55 images, a total of 858 red lesions were identified. Next, the complete set was randomly split into a test and a training set of 50 images each. Both the test and the training set contained 12 screening and 37 clinical images. As for red lesions, the test set contained 27 images with a total of 348 lesions, while the training set contained 28 images with a total of 510 red lesions. If two images were obtained from different eyes of the same patient, both images were assigned to either the test or training set. Also, the clinical and screening images were distributed equally over both sets.

A number of different system setups were tested to determine which provides the best performance:

The hybrid system (HS) using both the hybrid object candidate extraction system and the complete set of features as defined earlier.

The pixel classification system (PC) using the pixel classification based candidate extraction system and the complete set of features except feature 13 which is unique for the mathematical morphology based system.

The mathematical morphology based system using the complete set of features (MMA).

The mathematical morphology based system using the original 13 features as proposed by Spencer-Frame (MMO).

All systems used a kNN classifier for the classification of the candidate objects. Set 2 was also annotated by a second ophthalmologist. This allowed a comparison of the performance of the automatic systems with that of a human expert.

A. Settings

For each system, the parameter settings as detailed in the previous sections were used.

For the candidate object classification step, the optimal value of k for the kNN classifier was determined using the training set. For all systems, an optimal value of k=11 was found except for the MMA where k=9.

B. Results

Table I shows an overview of the extraction performance of all tested systems when detecting candidate red lesion objects in the test set.

TABLE I

|  | Hybrid System | Pixel Classification | Mathematical Morphology | Human Expert |
|---|---|---|---|---|
| Total nr. of candidates | 14906 | 13680 | 10209 | 478 |
| Lesions missed | 33 (9.48%) | 49 (14.1%) | 49 (14.1%) | 108 (31.0%) |

Figure 8A:
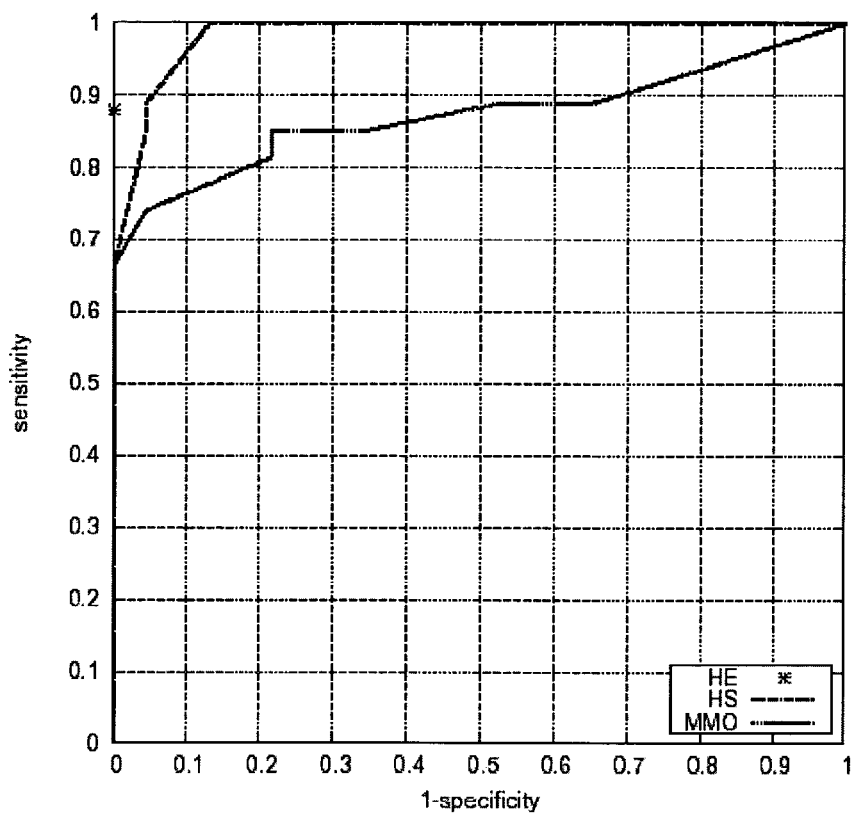
FIG. 8a shows ROC curves of the hybrid system (HS), the mathematical morphology based system using the original 13 features used in the Spencer-Frame System (MMO) and the human expert (HE). The sensitivity and specificity are on a per image basis.

Evaluating the final classification performance of a red lesion detection system is application dependent. When using the method as a pre-screening system as described earlier, its purpose can be to determine whether or not an image is normal, i.e., free of red lesions, or abnormal, i.e. containing one or more red lesions. Receiver Operating Characteristic (ROC) curve analysis can be used to evaluate this type of performance. The ROC curve plots the sensitivity against the specificity of a system. It is an indication of the capability of the system to discriminate between those images containing red lesions and those that do not contain red lesions. FIG. 8(*a*) shows the ROC curves of the HS and the MMO. Because the human expert provides one sensitivity/specificity pair its performance can be represented by a single point in FIG. 8*a,b*.

As a tool to assist a human expert in detecting subtle red lesions, performance can be measured using Free-Response Operating Characteristic (FROC) analysis. When the aforementioned method is used for assisting a human, the goal of the method is to detect as many lesions as possible while not generating an excessive number of FPs. FIG. 8(*b*) shows the FROC curves of both the HS and the MMO. An FROC curve plots the sensitivity of the system with regard to all the red lesions in the test set against the average number of FPs per image. This gives an indication of the actual red lesion detection performance of the systems. The horizontal axis in FIG. 8(*b*) has a logarithmic scale.

Table II shows the performance of all systems at two important operating points. The first operating point has the same sensitivity per image as the human expert, 0.89, and the second operating point is the point with the highest specificity at which the sensitivity is 1.

TABLE II

| System | Sensitivity per image | Specificity per image | Sensitivity per lesion | Average nr. of FP per image |
|---|---|---|---|---|
| HS | 0.89 | 0.96 | 0.26 | 0.44 |
|  | 1.00 | 0.87 | 0.31 | 0.80 |
| PC | 0.89 | 0.96 | 0.21 | 0.36 |
|  | 1.00 | 0.53 | 0.46 | 4.10 |
| MMA | 0.89 | 0.96 | 0.22 | 0.42 |
|  | 1.00 | 0.60 | 0.42 | 2.54 |
| MMO | 0.89 | 0.48 | 0.34 | 4.38 |
|  | 1.00 | 0.00 | 0.86 | 1.96 |
| Human Expert | 0.89 | 1.00 | 0.68 | 2.60 |

The results show that the hybrid system described herein, when used as a pre-screening tool, can operate at a sensitivity of 100% combined with 87% specificity. This means a large decrease in images which have to be screened by an ophthalmologist. The performance of the system on a per image basis is close to that of a human expert. Using previous systems in a pre-screening setup is not practical because it is not able to attain 100% sensitivity without its specificity dropping to 0%.

Figure 9:
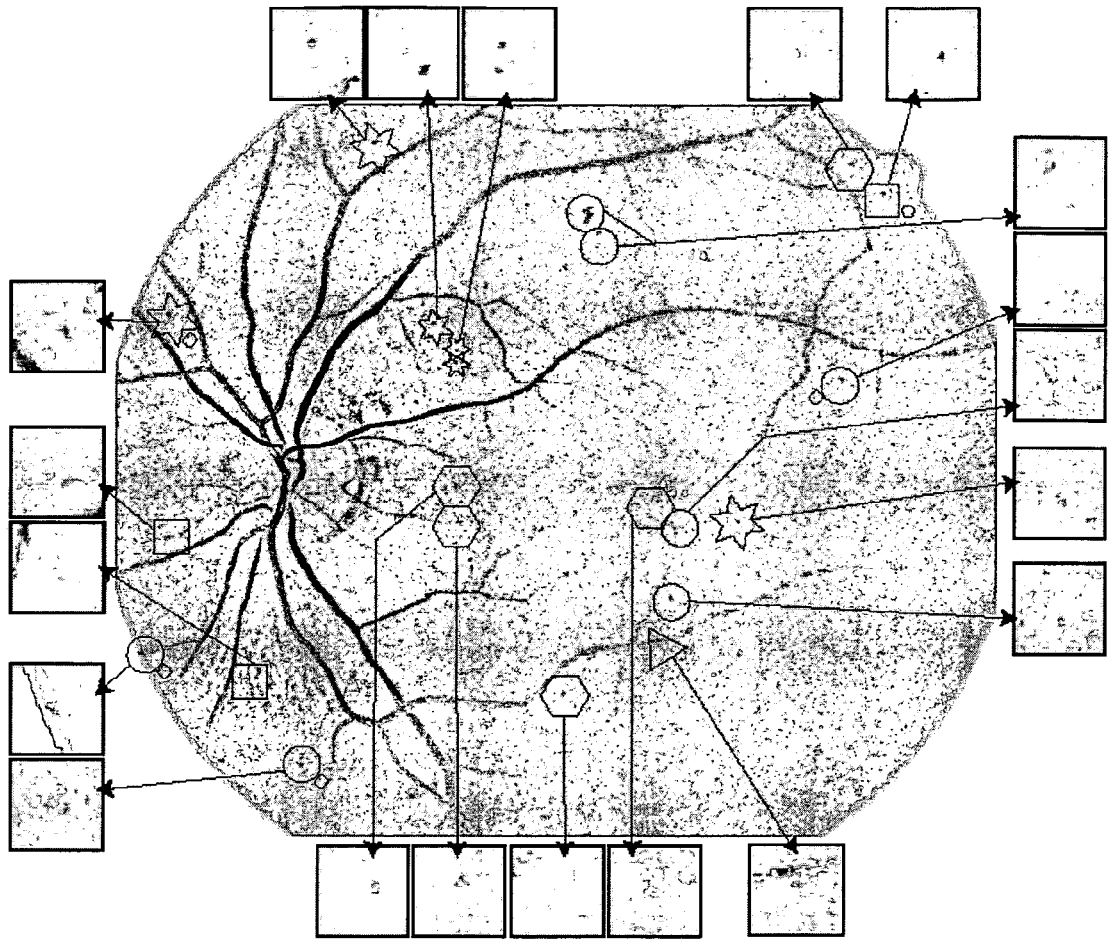
FIG. 9 shows an example of a final result of the hybrid red lesion detection system. All detected objects have been marked on the image using different shapes. When an object belongs to multiple classes (e.g. is both a true positive (TP), of the hybrid system and a false negative (FN) of the human expert) the indicator of the second class is displayed smaller close to the first class.

The first candidate detection step of the hybrid system combined the detected candidates of the mathematical morphology with the candidates of the pixel classification based system. It was important to miss as few red lesions as possible in the first candidate selection step because any lesions lost in this step could not be retrieved later. Therefore, each system can be adjusted for maximum sensitivity in the first step, assuring that the largest number of lesions is detected. This causes a large number of spurious candidate objects to be detected. Table I shows that the hybrid system detected more red lesions than the other systems, but it also detected the largest number of candidate objects overall. There are a number of reasons why 33 lesions were missed by the hybrid detection system. Approximately half of them are very close or connected with the vasculature; both the mathematical morphology as well as the pixel classification based approach had problems finding these. An example of this type of missed lesion is shown in FIG. 9. The other half of the missed lesions were extremely subtle or blurred. Some of these objects were not detected at all, and if they were detected, the region growing procedure often failed to find the object border and grew into nearby objects. FIG. 9 shows an example of a final result of the hybrid red lesion detection system. True positives (TPs) 901 of the automatic system, false positives (FPs) 902 of the automatic system, and false negatives (FNs) 903 of the automatic system are indicated. Objects 904 missed in the candidate detection step are indicated. FPs 905 and FNs 906 of the human expert are also indicated. The system was operating at a per image sensitivity/specificity of 1.00/0.87 and a per lesion sensitivity of 0.31 at 0.80 average FPs 902 per image. This image contains 14 red lesions according to the reference standard. The second observer correctly identified 10 of those (71.4%), produced 6 FPs 902 and 4 FNs 903. The automatic system correctly identified 6 red lesions (42.9%), produced 3 FPs 902 and 8 FNs 903. One of the FNs 903 is a lesion that was missed in the first hybrid candidate detection step and thus the system will not be able to detect this lesion regardless of the operating point that is used. All detected objects have been marked on the image using different shapes. When an object belongs to multiple classes (e.g. is both a TP 901, of the hybrid system and a FN 906 of the human expert) the indicator of the second class is displayed smaller close to the first class. The contrast in this image has been adjusted for optimal display.

The human expert was asked to mark any possible red lesions found in the set; this resulted in 478 marked objects and a total of 108 missed. So given the task of detecting possible red lesions, the human expert was less sensitive but much more specific than the HS. The HS was operating at 3.80 average FPs per image; it detected 27 red lesions which were not found by the human expert. On average this is one lesion per positive image in the test set. When the operating point was changed so that the average number of FP per image was increased to 9.94, the system found 41 lesions the human expert did not detect. This is a good indication that the HS could be useful as a second reader that would help an ophthalmologist detect subtle lesions.

Figure 8B:
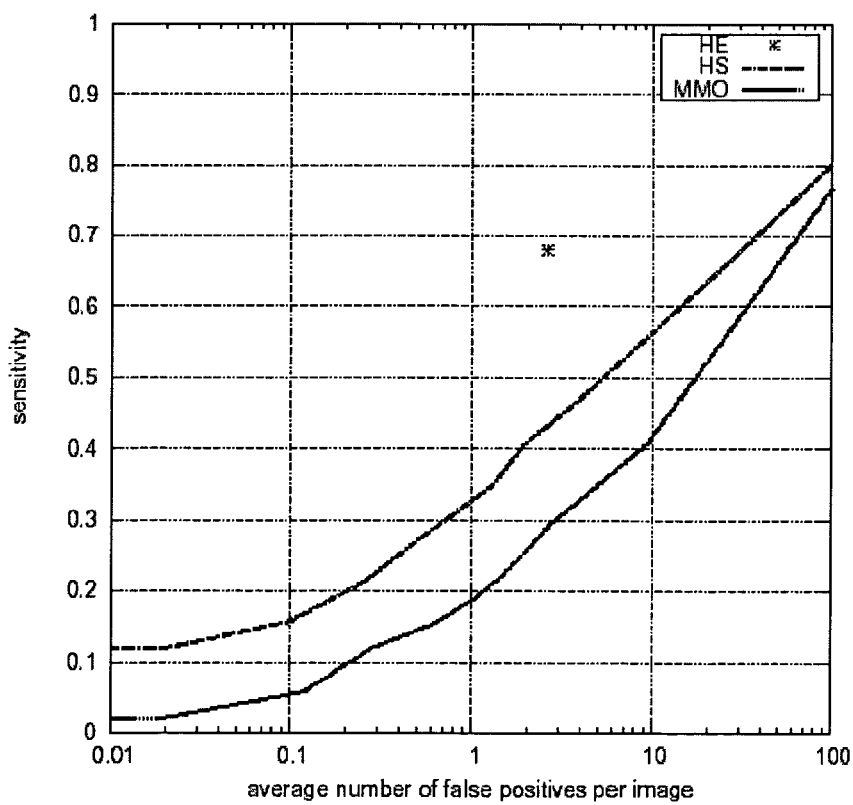
FIG. 8b shows FROC curves of the HS, MMO and HE. The sensitivity of the detection is given on a per lesion basis. The average number of false positives per image is taken over all images in the test set. The horizontal axis has a logarithmic scale.

As FIG. 8(a), 8(b) and Table II show, the human expert did not detect every abnormal image in the test set nor found all red lesions. This disagreement with the reference standard has several possible reasons. Because the images have been JPEG compressed and many red lesions are very small, it is easy for some to be missed. Further, it is possible that the second expert read the images differently than the first. When an ophthalmologist performs a clinical reading of a color fundus photograph, the precise number of lesions is less important than their location. Observation of a number of cases showed that a significant number of FN lesions of the second observer were located outside of the vascular arch. Lesions in that part of the fundus are clinically less relevant. It can be that the second human expert interpreted the images more in terms of clinical relevance of the lesions than the expert who defined the reference standard even though both were given the same task description. This effect is visible in FIG. 9. Most of the FN of the human expert were located outside of the vascular arch while most TP and FP were located inside of the vascular arch.

While the human expert missed 31% of all lesions, its per lesion sensitivity, 68%, was significantly higher than any of the automatic systems. This was caused by the fact that although more lesions were missed by the human expert, the number of detected lesions which were classified correctly was higher. The hybrid system reached 100% sensitivity on a per image basis when the sensitivity on a per lesion basis was at 30%. The probable reason for this sensitivity difference is that some of the images contained more red lesions than others, and thus, the system did not need a very high per lesion sensitivity as long as it was able to detect at least one of the lesions in each of the images. On average, the 27 positive images in the test set contained 12.9 lesions with a standard deviation of 9.47. The high standard deviation indicated the diversity of the test set, in which both images containing a large number of lesions (5 images with more than 20 red lesions) and subtle images (9 images with less than 7 lesions) were represented. Generally the more lesions an image contained, the easier it was for the automatic system to detect it as a positive. The test set used partly consisted of images obtained in a tertiary referral hospital in addition to images obtained in a screening program. There was a small difference in performance in favor of the screening images Through the use of advanced pattern recognition techniques, some parts of the system can be optimized further. This includes the use of more advanced classifiers such as support vector machines or techniques such as boosting. By increasing the amount of training data for the candidate object classification, overall system performance can be further improved. Large red lesions are not always completely segmented by the used region growing procedure; the region growing procedure can be replaced by a different segmentation method.

The total time required by the fully automatic hybrid system to process a single image was approximately 15 minutes. All methods were conducted using an Intel Pentium IV based computer running at 1.7 GHz. Most of this time was spent during the initial candidate detection step, i.e., the pixel classification procedure. However, this was just one implementation and performance can be improved.

Summarizing, the system and method presented detected every positive image in the test set while classifying only a small number of negative images as positive.

The foregoing detailed description has been given for understanding exemplary implementations of the invention only, and no unnecessary limitations should be understood therefrom as modifications will be obvious to those skilled in the art without departing from the scope of the appended claims and their equivalents.

We claim:

1. A method of identifying a subject with a disease of the retina comprising automatically detecting in a digital color fundus photograph of the subject abnormal objects in an $Image_{ORG}$, comprising:
   a. reducing intensity variation in the $Image_{ORG}$ producing a shade-corrected image, $Image_{SC}$ and a background image, $Image_{BG}$;
   b. automatically detecting candidate objects in the $Image_{SC}$; and
   c. automatically classifying the candidate objects as abnormal or normal, wherein classification of an object as abnormal identifies a subject with a disease of the retina, wherein step b comprises,
      removing bright lesions in the $Image_{SC}$ to produce an $Image_{PP}$,
      training a classifier with a supervised procedure using example pixels extracted from a labeled reference standard training set,
      obtaining pixel feature vectors from the $Image_{PP}$ comprising applying filters for determining pixel intensities or other characteristics of pixels at each pixel location or pixel region in the $Image_{PP}$,
      automatically classifying each of a plurality of the $Image_{PP}$ pixels as foreground or background pixels,
      assigning a posterior probability of being a foreground pixel to each $Image_{PP}$ pixel according to the equation p=n/k, producing an $Image_{PROB}$,
      removing the $Image_{PROB}$ pixels where the posterior probability is less than a probability threshold, producing an $Image_{BIN-PC}$,
      removing any object in the $Image_{BIN-PC}$ with a size that is above a size threshold, generating a plurality of one or more seed coordinates,
      applying a region-growing procedure using the plurality of one or more seed coordinates to the $Image_{SC}$ to grow a set of candidate objects, and
      filling empty pixels within the grown objects of the set of candidate objects.

2. The method of claim 1, wherein the classifier is selected from the group consisting of:
   a. a k-Nearest Neighbors classifier;
   b. a linear discriminant classifier;
   c. a quadratic discriminant classifier; and
   d. a support vector machine.

3. The method of claim 1, wherein the probability threshold is from about 0 to about 1.

4. The method of claim 3, wherein the probability threshold is about 0.4.

5. The method of claim 1, wherein automatically classifying each of a plurality of the Image$_{PP}$ pixels as foreground or background pixels comprises a supervised procedure.

6. The method of claim 1, wherein the size threshold is from about 30 pixels to about 600 pixels.

7. The method of claim 6, wherein the size threshold is about 300 pixels.

8. The method of claim 1, wherein the set of candidate objects comprises image coordinates.

9. The method of claim 1, wherein the set of candidate objects comprises an image.

10. A method of identifying a subject with a disease of the retina comprising automatically detecting in a digital color fundus photograph of the subject abnormal objects in an Image$_{ORG}$, comprising:
   a. reducing intensity variation in the Image$_{ORG}$ producing a shade-corrected image, Image$_{SC}$ and a background image, Image$_{BG}$;
   b. automatically detecting candidate objects in the Image$_{SC}$; and
   c. automatically classifying the candidate objects as abnormal or normal, wherein classification of an object as abnormal identifies a subject with a disease of the retina, wherein step b comprises,
      applying mathematical morphology based candidate object detection to produce a first set of candidate objects,
      applying a supervised pixel classification based candidate object detection to produce a second set of candidate objects,
      combining the first set of candidate objects and the second set of candidate objects to form a third set of candidate objects,
      identifying in the third set of candidate objects a plurality of pairs of overlapping objects, and
      removing one object from each pair of overlapping objects in the third set of candidate objects.

11. A method of identifying a subject with a disease of the retina comprising automatically detecting in a digital color fundus photograph of the subject abnormal objects in an Image$_{ORG}$, comprising:
   a. reducing intensity variation in the Image$_{ORG}$ producing a shade-corrected image, Image$_{SC}$ and a background image, Image$_{BG}$;
   b. automatically detecting candidate objects in the Image$_{SC}$; and
   c. automatically classifying the candidate objects as abnormal or normal, wherein classification of an object as abnormal identifies a subject with a disease of the retina, wherein step b comprises,
      applying a morphological transformation to the Image$_{SC}$ to discriminate circular from elongated regions producing a vasculature map;
      subtracting the vasculature map from the Image$_{SC}$ to produce an Image$_{LESION}$;
      applying a matched filter to the Image$_{LESION}$ to enhance the contrast between background regions and abnormal regions producing an Image$_{MATCH}$;
      applying a brightness threshold to the Image$_{MATCH}$ to produce a binary digital fundus photograph, Image$_{BIN-MM}$, wherein the threshold is above the modal value of the Image$_{MATCH}$, generating a first plurality of one or more seed coordinates;
      applying a region-growing procedure using the first plurality of one or more seed coordinates to the Image$_{SC}$ to grow a first set of candidate objects;
      removing bright lesions in the Image$_{SC}$ to produce an Image$_{PP}$;
      training a classifier with a supervised procedure using example pixels extracted from a labeled reference standard training set;
      obtaining pixel feature vectors from the Image$_{PP}$ comprising applying filters for determining pixel intensities or other characteristics of pixels at each pixel location or pixel region in the Image$_{PP}$;
      automatically classifying each of a plurality of the Image$_{PP}$ pixels as foreground or background pixels;
      assigning a posterior probability of being a foreground pixel to each Image$_{PP}$ pixel according to the equation p=n/k, producing an Image$_{PROB}$;
      removing the Image$_{PROB}$ pixels where the posterior probability is less than a probability threshold, producing an Image$_{BIN-PC}$;
      removing any object in the Image$_{BIN-PC}$ with a size that is above a size threshold, generating a second plurality of one or more seed coordinates;
      applying a region-growing procedure using the second plurality of one or more seed coordinates to the Image$_{SC}$ to grow a second set of candidate objects;
      filling empty pixels in the grown objects of the second set of candidate objects;
      combining the first set of candidate objects and the second set of candidate objects to form a third set of candidate objects;
      identifying in the third set of candidate objects a plurality of pairs of overlapping objects; and
      removing one object from each pair of overlapping objects in the third set of candidate objects.

12. The method of claim 11, wherein the classifier is selected from the group consisting of:
   a. a k-Nearest Neighbors classifier;
   b. a linear discriminant classifier;
   c. a quadratic discriminant classifier; and
   d. a support vector machine.

13. The method of claim 11, wherein the brightness threshold is from about 2 to about 6.

14. The method of claim 13, wherein the brightness threshold is about 4.

15. The method of claim 11, wherein the probability threshold is from about 0 to about 1.

16. The method of claim 15, wherein the probability threshold is about 0.4.

17. The method of claim 11, wherein automatically classifying each of a plurality of the Image$_{PP}$ pixels as foreground or background pixels comprises a supervised procedure.

18. The method of claim 11, wherein the size threshold is from about 30 pixels to about 600 pixels.

19. The method of claim 18, wherein the size threshold is about 300 pixels.

20. The method of claim 11, wherein the removed overlapping object is the larger object of each pair.

21. The method of claim 1, wherein automatically classifying the candidate objects as abnormal or normal, wherein classification of an object as abnormal identifies a subject with a disease of the retina comprises:
   a. training a classifier with a supervised procedure using example objects extracted from a labeled reference standard training set;
   b. comparing each of the candidate objects using a set of features, wherein objects recognized by the classifier as abnormal are classified as abnormal with a certain probability and objects recognized by the classifier as normal are classified as normal with a certain probability; and c. identifying a subject whose candidate objects are identified as abnormal with a certain probability as having a disease of the retina.

22. The method of claim 21, wherein the classifier is selected from the group consisting of:

a. a k-Nearest Neighbors classifier;
b. a linear discriminant classifier;
c. a quadratic discriminant classifier; and
d. a support vector machine.

23. The method of claim 21 wherein the set of features is selected from the group consisting of:

a. the area $\alpha = \Sigma_{j \in \Omega} 1$ where $\Omega$ is the set of pixels in the candidate;
b. the perimeter p which is approximated using the chaincodes of the object;
c. the number of odd $n_o$ and even $n_e$ chaincodes are counted then $p = n_o \sqrt{2} + n_e$;
d. the aspect ratio $r = l/w$, wherein l is the length of the largest and w of the second largest eigenvector of the covariance matrix of the object;
e. the circularity $$c = \frac{p^2}{4\pi a};$$

f. the total intensity of the object in the original green plane image $i_{green} = \Sigma_{j \in \Omega} g_j$ where $g_j$ represents the j-th pixel in the original green plane image;
g. the total intensity of the object in the shade corrected image $i_{sc} = \Sigma_{j \in \Omega} s_j$ where $s_j$ represents the j-th pixel in the shade corrected image;
h. the mean intensity under the object in the original green plane image $m_{green} = i_{green}/\alpha$;
i. the mean intensity under the object in the shade corrected image $m_{sc} = i_{sc}/\alpha$;
j. the normalized intensity in the original green plane image $$NI_{green} = \frac{1}{\sigma}(i_{green} - x)$$

where $\sigma$ and x are the standard deviation and average pixel value of $I_{bg}$;
k. the normalized intensity in the shade corrected image $$NI_{sc} = \frac{1}{\sigma}i;$$

l. the normalized mean intensity in the original image $$NM_{green} = \frac{1}{\sigma}(m_{green} - x);$$

m. the normalized mean intensity in the shade corrected image $$NM_{sc} = \frac{1}{\sigma}m_{green};$$

n. the intensity of the region growing seed in the match filtered image $I_{match}$;
o. the compactness $$v = \sqrt{\frac{\sum_{j=1}^{n} d_j - \overline{d}}{n}}$$

wherein $d_j$ is the distance from the centroid of the object to its j-th boundary pixel and d is the mean of all the distances from the centroid to all the edge pixels and n is the number of edge pixels;
p. the difference between the mean pixel values inside the object and mean values in a circular region centered on the object in the red plane from the RGB color space $$rd(j) = \frac{1}{n_\Omega}\Sigma_{j \in \Omega}R_j - \frac{1}{n_\Theta}\Sigma_{j \in \Theta}R_j,$$

wherein $\Omega$ is the set of pixels in the candidate and $\Theta$ is the set of pixels included in the circular region excluding the pixels in $\Omega$. $R_j$ is the j-th pixel in the red image plane and the diameter of the circular region is determined by taking the maximum distance from the object centroid to any of the edges of an axis aligned bounding box and adding three. $n_\Omega$ and $n_\Theta$ are the number of pixels in $\Omega$ and $\Theta$ respectively;
q. as feature p but extracted from the green image plane;
r. as feature p but extracted from the blue image plane;
s. as feature p but extracted from the hue image plane taken from the HSI color space;
t. the mean and standard deviation of filter outputs under the object wherein the filters comprise the Gaussian and its derivatives up to second order at scales $\sigma = 1, 2, 4, 8$ pixels;
u. the average value under the object of the absolute difference of the two largest eigenvalues of the Hessian tensor wherein the scale $\sigma = 2$ is used for the Gaussian partial derivatives that make up the Hessian;
v. the average output under the object of an iris filter used on $I_{sc}$ with a minimum circle radius of 4, maximum radius of 12 and 8 directions; and
w. adding the determinant and eigenvalues of the Hessian matrix of a pixel.

24. The method of claim 1 wherein the objects classified as abnormal comprise at least one of:

microaneurysms, dot hemorrhages, flame-shaped hemorrhages, sub-intimal hemorrhages, sub-retinal hemorrhages, pre-retinal hemorrhages, micro-infarctions, cotton-wool spots, and yellow exudates.

25. A system that identifies a subject with a disease of the retina by detecting in a digital color fundus photograph of the subject abnormal objects in an $Image_{ORG}$, comprising:

a processor; and
a computer readable medium coupled to said processor for storing a computer program comprising, computer code that reduces intensity variation in the Image$_{ORG}$ producing a shade-corrected image, Image$_{SC}$ and a background image, Image$_{BG}$, computer code that automatically detects candidate objects in the Image$_{SC}$, and computer code that automatically classifies the candidate objects as abnormal or normal, wherein classification of an object as abnormal identifies a subject with a disease of the retina, wherein computer code that automatically detects candidate objects in the Image$_{SC}$ comprises, removing bright lesions in the Image$_{SC}$ to produce an Image$_{PP}$, training a classifier with a supervised procedure using example pixels extracted from a labeled reference standard training set, obtaining pixel feature vectors from the Image$_{PP}$ comprising applying filters for determining pixel intensities or other characteristics of pixels at each pixel location or pixel region in the Image$_{PP}$, automatically classifying each of a plurality of the Image$_{PP}$ pixels as foreground or background pixels, assigning a posterior probability of being a foreground pixel to each Image$_{PP}$ pixel according to the equation p=n/k, producing an Image$_{PROB}$, removing the Image$_{PROB}$ pixels where the posterior probability is less than a probability threshold, producing an Image$_{BIN-PC}$, removing any object in the Image$_{BIN-PC}$ with a size that is above a size threshold, generating a plurality of one or more seed coordinates, applying a region-growing procedure using the plurality of one or more seed coordinates to the Image$_{SC}$ to grow a set of candidate objects, and filling empty pixels within the grown objects of the set of candidate objects.

26. The system of claim 25, wherein the computer code that automatically classifies the candidate objects as abnormal or normal, wherein classification of an object as abnormal identifies a subject with a disease of the retina further comprises:

computer code that trains a classifier with a supervised procedure using example objects extracted from a labeled reference standard training set;

computer code that compares each of the candidate objects using a set of features, wherein objects recognized by the classifier as abnormal are classified as abnormal with a certain probability and objects recognized by the classifier as normal are classified as normal with a certain probability; and computer code that identifies a subject whose candidate objects are identified as abnormal with a certain probability as having a disease of the retina.

27. A system that identifies a subject with a disease of the retina by detecting in a digital color fundus photograph of the subject abnormal objects in an Image$_{ORG}$, comprising.

a storage device for storing digital fundus image data; and a processor operably coupled to the storage device for performing the steps of:

reducing intensity variation in the Image$_{ORG}$ producing a shade-corrected image, Image$_{SC}$ and a background image, Image$_{BG}$, automatically detecting candidate objects in the Image$_{SC}$, and automatically classifying the candidate objects as abnormal or normal, wherein classification of an object as abnormal identifies a subject with a disease of the retina, wherein automatically detecting candidate objects in the Image$_{SC}$ comprises, applying mathematical morphology based candidate object detection to produce a first set of candidate objects, applying a supervised pixel classification based candidate object detection to produce a second set of candidate objects, combining the first set of candidate objects and the second set of candidate objects to form a third set of candidate objects, identifying in the third set of candidate objects a plurality of pairs of overlapping objects, and removing one object from each pair of overlapping objects in the third set of candidate objects.

28. The system of claim 27, wherein automatically classifying the candidate objects as abnormal or normal, wherein classification of an object as abnormal identifies a subject with a disease of the retina further comprises:

training a classifier with a supervised procedure using example objects extracted from a labeled reference standard training set;

comparing each of the candidate objects using a set of features, wherein objects recognized by the classifier as abnormal are classified as abnormal with a certain probability and objects recognized by the classifier as normal are classified as normal with a certain probability; and identifying a subject whose candidate objects are identified as abnormal with a certain probability as having a disease of the retina.

29. A computer readable storage medium having computer executable instructions embodied thereon for performing a method of identifying a subject with a disease of the retina comprising automatically detecting in a digital color fundus photograph of the subject abnormal objects in an Image$_{ORG}$, comprising:

a. reducing intensity variation in the Image$_{ORG}$ producing a shade-corrected image, Image$_{SC}$ and a background image, Image$_{BG}$;

b. automatically detecting candidate objects in the Image$_{SC}$; and c. automatically classifying the candidate objects as abnormal or normal, wherein classification of an object as abnormal identifies a subject with a disease of the retina, wherein step b comprises, removing bright lesions in the Image$_{SC}$ to produce an Image$_{PP}$, training a classifier with a supervised procedure using example pixels extracted from a labeled reference standard training set, obtaining pixel feature vectors from the Image$_{PP}$ comprising applying filters for determining pixel intensities or other characteristics of pixels at each pixel location or pixel region in the Image$_{PP}$, automatically classifying each of a plurality of the Image$_{PP}$ pixels as foreground or background pixels, assigning a posterior probability of being a foreground pixel to each Image$_{PP}$ pixel according to the equation p=n/k, producing an Image$_{PROB}$, removing the Image$_{PROB}$ pixels where the posterior probability is less than a probability threshold, producing an Image$_{BIN-PC}$, removing any object in the Image$_{BIN-PC}$ with a size that is above a size threshold, generating a plurality of one or more seed coordinates, applying a region-growing procedure using the plurality of one or more seed coordinates to the Image$_{SC}$ to grow a set of candidate objects, and filling empty pixels within the grown objects of the set of candidate objects.

30. A computer readable storage medium having computer executable instructions embodied thereon for performing a method of identifying a subject with a disease of the retina comprising automatically detecting in a digital color fundus photograph of the subject abnormal objects in an $\text{Image}_{ORG}$, comprising a. reducing intensity variation in the $\text{Image}_{ORG}$ producing a shade-corrected image, $\text{Image}_{SC}$ and a background image, $\text{Image}_{BG}$;
  b. automatically detecting candidate objects in the $\text{Image}_{SC}$; and
  c. automatically classifying the candidate objects as abnormal or normal, wherein classification of an object as abnormal identifies a subject with a disease of the retina, wherein step b comprises, applying mathematical morphology based candidate object detection to produce a first set of candidate objects, applying a supervised pixel classification based candidate object detection to produce a second set of candidate objects, combining the first set of candidate objects and the second set of candidate objects to form a third set of candidate objects, identifying in the third set of candidate objects a plurality of pairs of overlapping objects, and removing one object from each pair of overlapping objects in the third set of candidate objects.

* * * * *

UNITED STATES PATENT AND TRADEMARK OFFICE
CERTIFICATE OF CORRECTION

| | | |
|---|---|---|
| PATENT NO. | : 7,474,775 B2 | Page 1 of 1 |
| APPLICATION NO. | : 11/392268 | |
| DATED | : January 6, 2009 | |
| INVENTOR(S) | : Abramoff et al. | |

It is certified that error appears in the above-identified patent and that said Letters Patent is hereby corrected as shown below:

In column 1, line 4, insert the following before "Cross Reference to Related Patent Application":

--GOVERNMENT SUPPORT CLAUSE
This invention was made with government support under Grant EY017066 awarded by the National Institutes of Health. The government has certain rights in the invention.--

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,474,775 B2  
APPLICATION NO. : 11/392268  
DATED : January 6, 2009  
INVENTOR(S) : Abramoff et al.

Page 1 of 1

It is certified that error appears in the above-identified patent and that said Letters Patent is hereby corrected as shown below:

Title page, item [73] Assignee: insert
-- UMC Utrecht Holding B.V., Utrecht (NL) --

Signed and Sealed this

Twenty-second Day of December, 2009

David J. Kappos
*Director of the United States Patent and Trademark Office*